(12) United States Patent
Santiago et al.

(10) Patent No.: US 11,010,284 B1
(45) Date of Patent: May 18, 2021

(54) SYSTEM FOR UNDERSTANDING NAVIGATIONAL SEMANTICS VIA HYPOTHESIS GENERATION AND CONTEXTUAL ANALYSIS

(71) Applicant: The Ultimate Software Group, Inc., Weston, FL (US)

(72) Inventors: Dionny Santiago, Weston, FL (US); John A. Maliani, Pembroke Pines, FL (US); Robert L. Vanderwall, Weston, FL (US); Michael L. Mattera, Coral Springs, FL (US); Brian R. Muras, Weston, FL (US); Keith A. Briggs, Coral Springs, FL (US); David Adamo, Sunrise, FL (US); Tariq King, Pembroke Pines, FL (US)

(73) Assignee: The Ultimate Software Group, Inc., Weston, FL (US)

( * ) Notice: Subject to any disclaimer, the term of this patent is extended or adjusted under 35 U.S.C. 154(b) by 0 days.

(21) Appl. No.: 15/994,910

(22) Filed: May 31, 2018

(51) Int. Cl.
*G06F 11/36* (2006.01)
*G06N 5/04* (2006.01)
*G06N 20/00* (2019.01)

(52) U.S. Cl.
CPC ...... *G06F 11/3684* (2013.01); *G06F 11/3688* (2013.01); *G06F 11/3692* (2013.01); *G06N 5/041* (2013.01); *G06N 20/00* (2019.01)

(58) Field of Classification Search
CPC .......... G06F 16/24522; G06F 16/3344; G06F 17/27; G06F 17/2715; G06F 17/2785;
(Continued)

(56) References Cited

U.S. PATENT DOCUMENTS 5,045,994 A 9/1991 Belfer et al.
7,386,521 B2 6/2008 Adir et al.
(Continued)

FOREIGN PATENT DOCUMENTS

| CN | 101937438 | 6/2013 |
|---|---|---|
| CN | 102693183 | 4/2015 |

(Continued)

OTHER PUBLICATIONS

Teemu Leinonen et al.; Software as Hypothesis: Research-Based Design Methodology; ACM; pp. 61-70; retrieved on Dec. 30, 2020 (Year: 2018).*

(Continued)

*Primary Examiner* — S. Sough
*Assistant Examiner* — Cuong V Luu
(74) *Attorney, Agent, or Firm* — Akerman LLP; Mammen (Roy) P. Zachariah, Jr.

(57) ABSTRACT

A system for understanding navigational semantics via hypothesis generation and contextual analysis is disclosed. The system may, such as when examining and testing a software application, address the handling and resolution of constraint hypotheses in an uncertain environment, where potentially overlapping or conflicting suggestions are generated with various confidences. The system may utilize algorithmic and/or machine learning tools to identify consistent constraints for the software application with the highest levels of confidence. During operation, the system may continuously perform hypothesis testing on constraints generated by the system, which may result in the creation of new hypotheses yielding improved confidences. Feedback from the hypothesis testing may be provided to knowledge sources to improve the processing of information subsequently processed by the system. The system may construct complex constraints on multiple fields or functional transi- (Continued)

tions with associated confidences. A constraint optimizer of the system may simplify constraints or reduce their quantities.

27 Claims, 7 Drawing Sheets

(58) Field of Classification Search
CPC .......... G06F 17/2809; G06F 17/2818; G06F 11/3668; G06F 11/3672; G06F 17/18; G06F 17/2775; G06F 3/0484; G06F 11/3452; G06F 11/3676; G06F 11/3684; G06F 11/3688; G06F 11/3692; G06N 20/00; G06N 5/041
See application file for complete search history.

(56) References Cited

U.S. PATENT DOCUMENTS

| | | | |
|---|---|---|---|
| 7,428,700 | B2 | 9/2008 | Wen et al. |
| 7,478,281 | B2 | 1/2009 | Denniston |
| 7,599,831 | B2 | 10/2009 | Ford |
| 7,694,181 | B2 | 4/2010 | Noller et al. |
| 7,712,000 | B2 | 5/2010 | Khoche et al. |
| 7,797,687 | B2 | 9/2010 | Tillmann et al. |
| 7,849,425 | B1 | 12/2010 | Hamid et al. |
| 7,895,148 | B2 | 2/2011 | Ma et al. |
| 7,937,622 | B2 | 5/2011 | Mehrotra |
| 7,958,495 | B2 | 6/2011 | Kelso |
| 8,301,998 | B2 | 10/2012 | Ruvini |
| 8,473,913 | B2 | 6/2013 | Moller et al. |
| 8,479,164 | B2 | 7/2013 | Becker et al. |
| 8,640,084 | B2 | 1/2014 | Murthy |
| 8,683,442 | B2 | 3/2014 | Peranandam et al. |
| 8,683,446 | B2 | 3/2014 | Paradkar et al. |
| 9,116,725 | B1 | 8/2015 | Baird |
| 9,223,669 | B2 | 12/2015 | Lin |
| 9,536,522 | B1 | 1/2017 | Hall et al. |
| 9,563,545 | B2 | 2/2017 | Bennah et al. |
| 2004/0015846 | A1 | 1/2004 | Haisraeli |
| 2005/0028077 | A1 | 2/2005 | Wen et al. |
| 2006/0106798 | A1 | 5/2006 | Wen et al. |
| 2007/0156720 | A1* | 7/2007 | Maren .............. G06N 5/02 |
| 2008/0082968 | A1* | 4/2008 | Chang .............. G06F 11/3688 717/128 |
| 2010/0064282 | A1 | 3/2010 | Triou et al. |
| 2011/0004442 | A1* | 1/2011 | Hathaway .......... G06F 3/0484 702/179 |
| 2013/0074043 | A1 | 3/2013 | Fu |
| 2014/0149797 | A1* | 5/2014 | Kalman ............ G06F 11/3668 714/38.1 |
| 2015/0095893 | A1* | 4/2015 | Tripp ............... G06F 11/3684 717/127 |
| 2015/0205782 | A1 | 7/2015 | Subramanya et al. |
| 2016/0055077 | A1 | 2/2016 | Baloch et al. |
| 2017/0010956 | A1 | 1/2017 | Chen et al. |
| 2017/0024311 | A1 | 1/2017 | Andrejko et al. |
| 2018/0173605 | A1* | 6/2018 | Kadioglu .......... G06F 11/3688 |
| 2019/0087313 | A1* | 3/2019 | Yang ............... G06F 11/3688 |

FOREIGN PATENT DOCUMENTS

| | | |
|---|---|---|
| CN | 104516818 | 4/2015 |
| WO | 2005059744 | 6/2005 |
| WO | 2016004657 | 1/2016 |

OTHER PUBLICATIONS

Jorge Melegati et al.; Hypotheses Engineering first essential steps of experiment-driven software development; ACM; pp. 16-19; retrieved on Dec. 30, 2020 (Year: 2019).*

Kephart et al. "The vision of autonomic computing," Computer 36.1, 2003, pp. 41-50. http://130.18.208.80/~ramkumar/acvision.pdf.

Appavoo et al., "Enabling autonomic behavior in systems software with hot swapping." IBM systems journal 42.1, 2003, pp. 60-76. https://pdfs.semanticscholar.org/ee1b/c723187317a3bebd0af01d218e51b818b16b.pdf.

Petke et al., "Genetic Improvement of Software: a Comprehensive Survey," IEEE Transactions on Evolutionary Computation, vol. PP, Issue: 99, pp. 1-1, Apr. 25, 2017, Print ISSN: 1089-778X, Electronic ISSN: 1941-0026, DOI: 10.1109/TEVC.2017.2693219, http://ieeexplore.ieee.org/stamp/stamp.jsp?arnumber=7911210.

Kelong et al., "Implementation of automated testing system for android applications based on dynamic taint propagation," 2014 Communications Security Conference, pp. 1-5, DOI: 10.1049/cp.2014.0736, Referenced in: Cited by: Papers (1) IET Conference Publications. http://ieeexplore.ieee.org/stamp/stamp.jsp?tp=&arnumber=6992229.

Sterritt et al., "Autonomic Computing-a means of achieving dependability?." Engineering of Computer-Based Systems, 10th IEEE International Conference and Workshop on the IEEE, 2003.

Truszkowski et al., "The Challenge of Building Autonomous Software." IT Professional, vol. 6, Sep.-Oct. 2004, pp. 47-52, published Nov. 30, 2004, IISSN: 1520-9202, INSPEC Accession No. 8202596 DOI: 10.1109/MITP.2004.66.

* cited by examiner

Price Range Constraint Fragment

402 {
((Minimum Price != null && Maximum Price != null && Minimum Price <= Maximum Price && Minimum Price >= $0.00 && Maximum Price <= $100.00) ||
(Minimum Price != null && Maximum Price == null && Minimum Price >= $0.00 && Minimum Price <= $100.00) ||
(Minimum Price == null && Maximum Price != null && Maximum Price >= $0.00 && Maximum Price <= $100.00) ||
(Minimum Price == null && Maximum Price == null))

Year Range Constraint Fragment

404 {
((Minimum Year != null && Maximum Year != null && Minimum Year <= Maximum Year && Minimum Year >= 1980 && Maximum Year <= 2017) ||
(Minimum Year != null && Maximum Year == null && Minimum Year >= 1980 && Minimum Year <= 2017) ||
(Minimum Year == null && Maximum Year != null && Maximum Year >= 1980 && Maximum Year <= 2017) ||
(Minimum Year == null && Maximum Year == null))

FIG. 4

Finalized Total Generalized Constraint

502

(((Minimum Price != null && Maximum Price != null && Minimum Price <= Maximum Price && Minimum Price >= $0.00 && Maximum Price <= $100.00) ||
(Minimum Price != null && Maximum Price == null && Minimum Price >= $0.00 && Minimum Price <= $100.00)
||
(Minimum Price == null && Maximum Price != null && Maximum Price >= $0.00 && Maximum Price <= $100.00)
||
(Minimum Price == null && Maximum Price == null))

&&

((Minimum Year != null && Maximum Year != null && Minimum Year <= Maximum Year && Minimum Year >= 1980 && Maximum Year <= 2017) ||
(Minimum Year != null && Maximum Year == null && Minimum Year >= 1980 && Minimum Year <= 2017) ||
(Minimum Year == null && Maximum Year != null && Maximum Year >= 1980 && Maximum Year <= 2017) ||
(Minimum Year == null && Maximum Year == null)))

SYSTEM FOR UNDERSTANDING NAVIGATIONAL SEMANTICS VIA HYPOTHESIS GENERATION AND CONTEXTUAL ANALYSIS

CROSS-REFERENCE TO RELATED APPLICATIONS

The present application is related to U.S. patent application Ser. No. 15,905,362, filed on Feb. 26, 2018, which is hereby incorporated by reference in its entirety. The present application is also related to U.S. patent application Ser. No. 15/994,984, filed on May 31, 2018, and title "System for Optimizing System Resources and Runtime During a Testing Procedure"; U.S. patent application Ser. No. 15/994,869, filed on May 31, 2018, and title "System for Providing Intelligent Part of Speech Processing of Complex Natural Language"; U.S. patent application Ser. No. 15/994,851, filed on May 31, 2018, and title "System for Discovering Semantic Relationships in Computer programs; and U.S. patent application Ser. No. 15/994,845, filed on May 31, 2018, and title "System for Providing Autonomous Discovery of Field or Navigation Constraints," all of which are hereby incorporated by reference in the present disclosure in their entireties.

FIELD OF THE INVENTION

The present application relates to computing technologies, natural language processing technologies, machine learning technologies, testing technologies, hypothesis testing technologies, constraint determination technologies, software evaluation technologies, software optimization technologies, and more particularly, to a system and method for understanding navigational semantics via hypothesis generation and contextual analysis.

BACKGROUND

In today's technologically-driven society, users and businesses are increasingly relying on software application and computing systems for facilitating and providing various types of services. As the reliance and dependence on software applications and computing systems has increased, so has the need to provide rapid and accurate updates to software applications and computing systems that are tailored to users' and businesses' ever evolving needs. In order to ensure that rapid and accurate updates to software applications and computing systems are provided, efficient and effective testing of such software applications and computing systems should be performed to ensure that users and businesses experience minimal errors, minimal inaccuracies, and/or optimized functionality when interacting with such software applications and computing systems. To that end, in order to test, exercise, and/or navigate through a software application, it is often desirable to understand existing or desired constraints on fields of the software application, the order of operations to be conducted within the software application, and/or functional transitions between various states of the software application.

Constraints may be restrictions on the valid values which may be inputs or outputs associated with a computer application. For example, constraints may be physical, such as an English keyboard, which does not easily allow for non-English characters, such as Chinese. That is, a constraint constrains the user to the English character set. In certain environments, a constraint may apply to the communications into or out of a computer application and/or may restrict the use of a device. In certain instances, the constraint may be within the software, such as a constraint that does not allow a first user to update a second user's personal information. More commonly, a constraint can be a restriction on the allowable values that may be entered into some field on a computer application page. For example, maybe a "Month" field on some web page only allows the values 1-12, and any other value results in an error. In certain scenarios, the constraint may be that certain fields, menus, or buttons (or any other type of widget) are accessible (or not accessible) for a given user navigating the page. Typically, all constraints in some group may need to be satisfied to allow for some behavior, such as navigating to a next screen in a software application. Constraints may be derived or specified manually, or may be input via a template requirements entry process, such as an entry process facilitated by a computing system. A computing system, such as the existing Rational Rose system, may be capable of generating a model of the software application, including constraints, if given a highly detailed and complete set of computer system requirements developed using a rigid grammar with explicit and manually specified constraints. Unfortunately, such computing systems do not significantly eliminate the additional manual labor involved in generating the desired model. Instead, such systems shift the manual effort from that of model development to one of detailed requirements development, or vice versa. While such systems may automatically generate tests from the manually developed model, the models must continually be updated and changed to reflect a rapidly evolving software solution. Such continual maintenance efforts are not cost effective, and consequently, tests generated through such manually specified processes are considered brittle, i.e. the tests cannot accommodate minor changes to the software or system under evaluation and break easily. In certain scenarios, constraints may be generated naively by utilizing brute force algorithms that try many different values. For example, when performing boundary detection, an algorithm used by such naïve systems might be a binary search algorithm, which inputs successive values by dividing the search space at each stage in half. While in general such searches are computationally efficient when compared to a more simplistic solution which tests possible values in a linear sequence, binary search algorithms are significantly less efficient than guided systems which preferentially test high probability, predicted boundaries first. In certain scenarios, constraints may involve one or more parameters from one or more web pages, and may be written in relational logic, temporal logic, mathematical formulas, or many other types of grammars or languages.

Other systems may discover computer program constraints through the analysis of execution traces. In the context of websites, for example, in order to move past website pages and forms, current approaches may either require human aid for website form data selection or such approaches generate randomized data as inputs. Execution traces are then collected, by exercising an application utilizing this human aid. Given a suitable quantity of execution traces, currently disclosed systems may generate a set of likely program constraints. The process is error prone and difficult to verify, and requires a large volume of execution traces, making the approach impractical for extracting website semantics. Some research activities have demonstrated a limited capability to automatically explore a computer program and discover a generalized model of the computer program's behavior. However, such systems cannot effectively relate the self-discovered model to the external stories, requirements, or other data sources defining the desired functionality of the computer program. As a consequence, testing of the self-discovered model generates tautological results of limited utility. Such systems cannot discover discrepancies between the self-discovered model and the desired functionality of the computer program. As a consequence, such systems cannot produce tests that verify the desired functionality exists within the computer program. Other semi-automated testing, exercise, and navigation systems are dependent on the manual development or human directed semi-automated development of computer program tests or exercise and/or navigation tools. Such systems can incorporate the significant knowledge of the human operator, including the human's knowledge of information internal and external to the computer program, and consequently, such systems often include directed and efficient tests of computer program constraints. However, such system's dependence on human input significantly limits their application.

While testing systems currently exist for semi-autonomously testing software applications and computing systems, such systems cannot effectively associate available textual information from sources, from which constraints may be determined or inferred, with the field and/or navigation tasks that the constraints may restrict. Additionally, even when such associations are available, currently existing testing systems fail to intelligently process the textual information from various sources to extract constraints for input values, order of operations, and/or functional transitions for a software application being evaluated. As a result, currently existing testing systems attempt to discover constraints or appropriate values for such constraints through inefficient trial and error, through the parsing of models constructed using extensive manual input and labor, by examining the underlying software of the software application in detail, and/or through manual training of various aspects of the software application and/or computing systems supporting the software application. As an example, a software application may have a field named "Price", which may have Minimum and Maximum subfields, currently existing testing systems are incapable of intuitively determining that the field is a dollar-denominated field. Such existing testing systems typically rely on trial and error to determine the correct data type and the constraints for the subfields. As another example, if an error message is outputted by a software application being tested, currently existing systems are unable to read and process the error message and to relate the error message to the constraints for the fields of the software application. As a further example, a document may exist that describes the field of the software application, however, currently existing systems are unable to associate the information in the document with the field and/or determine constraints from the documentation. Notably, if the software application has many fields and parameters, or even a few sufficiently complex parameters, it may be virtually impossible to satisfy all the constraints to allow for successful navigation through the software application using currently existing trial and error techniques because of combinatorial effects.

Based on the foregoing, for existing systems, substantial manual effort may be required to understand a software application and to build a model with states, transitions, and/or constraints. For large systems, such a manual effort is likely intractable, and, thus, businesses will continue with navigating, exercising, and testing of software applications by using solutions that are dependent on accessing software application source code, detailed software application models, and/or solutions requiring human written software scripts and/or tests. Further, as the model is constructed using manual techniques, which are themselves prone to error, significant additional manual validation and verification must be performed on the manually generated model before it can be used for effectively evaluating and/or navigating a target application. Additionally, for such systems, businesses may rely on human directed training (i.e. recording steps taken by a human operator), or the direct human exercise of the software application being evaluated.

As a result, current testing technologies and processes may be modified and improved so as to provide enhanced functionality and features. Such enhancements and improvements may effectively decrease the effort required to determine and test constraints, while simultaneously improving the accuracy of the testing system. Additionally, such enhancements and improvements may provide for optimized constraint determination, increased application navigation capabilities, increased testing capabilities, increased learning capabilities, increased autonomy, improved interactions with users or devices, improved user satisfaction, increased efficiencies, increased access to meaningful data, substantially-improved decision-making abilities, and increased ease-of-use. Furthermore, such enhancements and improvements may reduce processor, memory, and network bandwidth usage. Moreover, such enhancements and improvements may increase a testing system's ability to test software applications more efficiently and effectively.

SUMMARY

A system and accompanying methods for understanding navigational semantics via hypothesis generation and contextual analysis are disclosed. Navigational semantics may be constraints in the context of the present disclosure and the hypotheses may be the foundation of affirmative tests on a constraint. Notably, the system and accompanying methods may be utilized to utilize data and textual information obtained from outputs of a software application, internal documents, external documents, hierarchical and/or graphical models, other information sources, or a combination thereof, to determine or infer the proper constraints across complex parameters and/or across related parameter fields to allow for the successful navigation, exercise, and/or testing of the software application. Additionally, the system and methods provide for state and constraint exploration based upon continuous generation, execution, and analysis of semantic hypotheses based on likely semantic suggestions from integrated knowledge sources. In certain embodiments, the system and methods provide for the state and/or transition constraint exploration based upon the natural language context of associated labels and correlated internal and/or external document sources. In order to accomplish the foregoing, the system and methods may correlate labels, help text, menus, error messages, audio alerts, visual alerts, (e.g. red font, bold font, highlighted font, highlighted background, highlighted input fields, etc.), multimedia training materials, and other information, which may be displayed by the software application with the field, order of operations, and/or transition constraints of interest associated with a software application. Additionally, the system and methods may correlate information from one or more internal and/or external document sources with the field, the order of operations, and/or transition constraints of interest associated with the software application.

Based on the correlations, the system and methods may include performing natural language processing on textual information extracted from the correlated application data and associated internal and/or external document information to generate one or more constraints for the field, the order of operations, and/or the transitions of the software application. In certain embodiments, the constraints may include a confidence value, which may be based on a variety of factors. In certain embodiments, the confidence value may be based on the strength of the correlation or association between the process information and the field, order of operations, and/or transitions of the software application, the quality of the natural language processing of the textual and contextual information, the source of the textual information (e.g. the system may trust one source (e.g. an internal API document) over another source (an online source or internet document) and thus having a higher confidence value for the API document source), the number of reinforcing and/or conflicting sources of constraint information, the complexity of the constraint, any other factor, or a combination thereof. In certain embodiments, the confidence may be explicitly or implicitly associated with a constraint. For example, in certain embodiments, the system 100 may reject constraints having less than 0.99 confidence, however, between 0.99 and 1.00, the system 100 may have implicit confidence associated with such constraints generated by the system 100 that fit between 0.99 and 1.00. In certain embodiments, the constraints may include, but are not limited to, types of values for fields and/or parameters of the software application (e.g. the input field is a dollar-denominated field), appropriate default values for the fields and/or parameters (e.g. a zero dollar value may be assumed for an input field), appropriate formatting settings for the values for the fields and/or parameters (e.g. the values are real numbers to two decimal points of precision), appropriate constraints on the fields and/or values (e.g. values must be between 0.00 and 100.00), the order in which operations should be performed in the software application (e.g. which fields of the software application are to be filled and in what order), an indication of which fields and/or parameters are required and which fields and/or parameters are optional, any other type of constraint-related information, or a combination thereof. In certain embodiments, the system 100 and methods may include merging or combining constraints if the information extracted from the various sources of information indicate that the constraints are compatible, related to each other, depend on one another, or a combination thereof, to improve the confidence value, to simplify and combine constraint, or to generate complex or relational constraints (e.g. a relational constraint having a requirement that a first field have a value that is less than the value contained in a second field). In certain embodiments, the system 100 and methods may include simplifying merged and/or combined constraints. In certain embodiments, the system 100 and methods may include detecting, based on analyzing the information provided by the various information sources, potential and/or actual defects in constraints or conflicts between constraints, desired constraints, or a combination thereof.

The system and methods may also include conducting hypothesis testing to increase (or decrease) the initial confidence value provided for the constraint. In certain embodiments, the resulting increased (or decreased) confidence value may be utilized according to the system 100 and methods to keep or discard the constraint, or prioritize the constraint over other constraints—either existing or suggested (i.e. determined by the system 100, for example). The system and methods may utilize a learning engine to assist in refining confidence values for constraints over time as new information is obtained from information sources, as new information is obtained from the results of natural language processing of textual information received from the information sources, and/or new information is received from the software application being tested itself. In certain embodiments, the learning engine of the system may identify and flag a data source or a collection of data sources, for which the constraint hypotheses tests generated from the data source or collection of data sources have failed. The learning engine may keep a history of the results of hypothesis tests, and over time be able to learn which learning sources were the most accurate. Therefore, the learning engine may prefer the more accurate source if it ever needs to decide between two constraints, or if there are limited system resources, it may only use constraints from the accurate source, and not waste system resources with the less accurate source. In certain embodiments, the constraints and/or related confidence values may be utilized to represent the software application being evaluated. In such embodiments, the constraint information may be utilized to successfully navigate or exercise the software application being evaluated. In another embodiment, the system and methods may include utilizing the constraints and/or related confidences to represent the desired or even intended functionality of the software application. In such an embodiment, the system and method may utilize the constraint information to support the autonomous testing of the software application being evaluated.

In certain embodiments, a softmatch method or function may be employed to correlate a potential constraint source with a target field of the application under evaluation, an order of operations of the application under evaluation, a transition of the application under evaluation, or a combination thereof. In certain embodiments, the softmatch method or function generates correlations, i.e. matches, where there may be some degree of uncertainty as to the correlation strength between the source and the target. In certain embodiments, the softmatch result may be computed from the application of one or more correlation similarity methods and may incorporate multiple pieces of data, text, concepts or constraints from the source or the target. In some embodiments, the softmatch may also utilize machine learning techniques to learn what constitutes high or low confidence matches over time, utilizing supervised learning results and/or the dynamically generated results of constraint hypothesis testing. In some embodiments, the confidences generated by the softmatch results, which constitute a match may return a normalized confidence value less than 1.0, where normalized match confidences values may range between 0.0 and 1.0). Where an explicit hard link between a constraint and a target field often requires manual generation, and where a hard link is often brittle, i.e. breaks under minor changes to the application under evaluation or its related documents, the softmatch may provide for the autonomous generation of correlations reflective of the present state of the application under evaluation 230 and related documents. Besides confidence, in some embodiments, the softmatch may be composed by having at least two similarity confidences computed. For example, a proximity check may determine that a source and target may be correlated based on their proximity to each other within the application under evaluation 230. Additionally, a comparison of parsed text extracted from the source data and target data may result in a natural language processing similarity score indicative of a correlation between the textual content of the source and target. In an embodiment of the system 100, the softmatch may merge two or more individually determined correlations into a combined score. In different embodiments, the combined score may be generated as an average, a weighted average, a min or max of the contributors, the score resulting from the most trusted source, a machine learned weighting, a normalized linear combination, a normalized non-linear combination, another method, or any combination thereof.

In one embodiment, the system may perform operations that include: identifying a source from an output of an application under evaluation by the system, extracting data from the source, parsing text from the source data, using at least one natural language processing technique to extract a source concept from the parsed text, and determining a source constraint based on the source concept. Additionally, the system may identify a constraint target as a field of the application under evaluation, an order of operations of the application under evaluation, a transition of the application under evaluation, or a combination thereof. Furthermore, the system may extract data from the constraint target, which extracted data may also include data extracted from semantically related elements of the application under evaluation or existing correlation data. The system may also generate a potential correlation by performing a softmatch between source information and target information, where source information may include source data, source text, source concept(s), and source constraint(s), and where target data may include, but is not limited to, target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly. In certain embodiments, the associating may further include merging or combining a source constraint and a preexisting constraint from the target.

In one embodiment, the system may perform operations that include: identifying a source from an output of an application under evaluation by the system, extracting data from the source, parsing text from the source data, using at least one natural language processing process to extract a source concept from the parsed text, and determining a source constraint based on the source concept. Additionally, the system may identify a constraint target as a field of the application under evaluation, an order of operations of the application under evaluation, a transition of the application under evaluation, or a combination thereof. Furthermore, the system may extract data from the constraint target. The extracted data may also include data extracted from semantically related elements of the application under evaluation or existing correlation data. The system may also generate a potential correlation by performing a softmatch between source information and target information, where source information may include source data, source text, source concept(s), and source constraint(s), and where target data may include target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly.

In another embodiment, the system may perform operations that include: identifying a source from an output of an application under evaluation by the system, extracting data from the source, parsing text from the source data, using at least one natural language processing process to extract a source concept from the parsed text, and determining a source constraint based on the source concept. Additionally, the system may identify a constraint target as a field of the application under evaluation, an order of operations of the application under evaluation, a transition of the application under evaluation, or a combination thereof. Furthermore, the system may extract data from the constraint target. The extracted data may also include data extracted from semantically related elements of the application under evaluation or existing correlation data. The system may also generate a potential correlation by performing a softmatch between source information and target information, where source information may include source data, source text, source concept(s), and source constraint(s), and where target data may include target data, target text parsed from target data, target concept(s), and existing constraint(s) extracted from target text using at least one natural language processing technique. The system may filter the potential correlation to remove correlations that do not meet other system criteria. The system may further associate the generated constraint with the target, wherein the generated constraint has a first confidence value, specified explicitly or implicitly. Moreover, the system may include conducting hypothesis testing on the constraint to increase a confidence value of the constraint to a greater confidence value.

In another embodiment, the system may identify a source from an output of an application under evaluation by the system, from documents internal to the system, documents external to the system, or a combination thereof. In a further embodiment, the system may iteratively or recursively, serially or in parallel, identify multiple sources from an output of an application under evaluation by the system, from documents internal to the system, documents external to the system, or a combination thereof. Similarly, in a further embodiment, the system may iteratively or recursively, serially or in parallel, identify multiple targets as a field of the application under evaluation, an order of operations of the application under evaluation, a transition of the application under evaluation, or a combination thereof. In such embodiments where multiple sources and/or targets are identified, an embodiment of the system may, serially or in parallel, iteratively or recursively, generate constraints, associate the constraints with targets, and assign confidence values to the constraints. In a further embodiment, a system may perform a screening filter using a subset of source data and/or a subset of target data, to generate a subset of high value source and constraint target pairings, using an operationally more efficient correlation screening method to reduce processing, network, memory or other performance loads. In such an embodiment, the system may calculate constraints and associated confidence values, and associate constraints to targets, only for those source and target pairs which pass the application of the screening filter.

In one embodiment, a system for understanding navigational semantics via hypothesis generation and contextual analysis is disclosed. The system may include a memory that stores instructions and a processor that executes the instructions to perform operations conducted by the system. The system may perform an operation that includes receiving an input comprising information associated with an application under evaluation by the system. The system may then perform an operation that includes determining, based on analyzing the input, a constraint for the application under evaluation. In certain embodiments, the constraint may be for a field of the application under evaluation, an order of operations of the application under evaluation, a transition of the application under evaluation, or a combination thereof. Based on the constraint, the input, or a combination thereof, the system may perform an operation that includes generating a hypothesis associated with the constraint and a test for testing, based on the hypothesis, the constraint. The system may proceed to perform an operation that includes testing, by utilizing the test on the application under evaluation and based on the hypothesis, the constraint. Once a result(s) of the testing are achieved, the system may perform an operation that includes generating feedback associated with a result of the testing of the constraint based on the hypothesis. The system may then proceed to perform an operation that includes adjusting, based on the feedback, the constraint, input information related to the constraint, or a combination thereof.

In another embodiment, a method for understanding navigational semantics via hypothesis generation and contextual analysis is disclosed. The method may include utilizing a memory that stores instructions, and a processor that executes the instructions to perform the various functions of the method. In particular, the method may include analyzing text extracted from an input associated with an application under evaluation by a system. In certain embodiments, the analyzing may be performed by utilizing one or more natural language processing techniques. Based on the analyzing, the method may include determining and/or generating a constraint for the application under evaluation. In certain embodiments, the constraint may be for a field of the application under evaluation, an order of operations of the application under evaluation, a transition of the application under evaluation, or a combination thereof. The method may then include generating, based on the constraint, a hypothesis associated with the constraint. Additionally, the method may include testing, by utilizing a test on the application under evaluation and based on the hypothesis, the constraint. Furthermore, the method may include generating feedback associated with a result of the testing of the constraint based on the hypothesis. Moreover, the method may include adjusting, based on the feedback, the constraint, input information related to the constraint, associated confidences or a combination thereof.

According to yet another embodiment, a computer-readable device, such as a non-transitory computer-readable device, having instructions stored thereon for understanding navigational semantics via hypothesis generation and contextual analysis is provided. The computer instructions, which when loaded and executed by a processor, may cause the processor to perform operations including: analyzing text extracted from an input, wherein the analyzing is performed by utilizing a natural language processing technique; determining, based on the analyzing, a constraint for an application under evaluation by a system, wherein the constraint is for a field of the application under evaluation, an order of operations of the application under evaluation, a transition of the application under evaluation, or a combination thereof; generating, based on the constraint and by utilizing instructions from a memory that are executed by a processor, a hypothesis associated with the constraint; testing, by utilizing a test on the application under evaluation, the hypothesis associated with the constraint; determining if the constraint is combinable with a different constraint based on a result of the testing of the hypothesis associated with the constraint, based on a confidence level of the hypothesis, based on a second confidence level of a second hypothesis associated with the different constraint, or a combination thereof; and combining the constraint with the different constraint to form a merged constraint if the constraint is determined to be combinable with the different constraint. In certain embodiments, the confidences may be applied to sources of the information and/or text extracted from the input as an indicator of each source's reliability and/or accuracy (an aspect of learning of the system 100).

These and other features of the systems and methods for understanding navigational semantics via hypothesis generation and contextual analysis are described in the following detailed description, drawings, and appended claims.

BRIEF DESCRIPTION OF THE DRAWINGS

FIG. 4 illustrates a pair of constraint fragments generated by the system of FIG. 1.

FIG. 5 illustrates the constraint fragments of FIG. 4 combined to form a finalized total constraint.

DETAILED DESCRIPTION OF THE INVENTION

Figure 1:
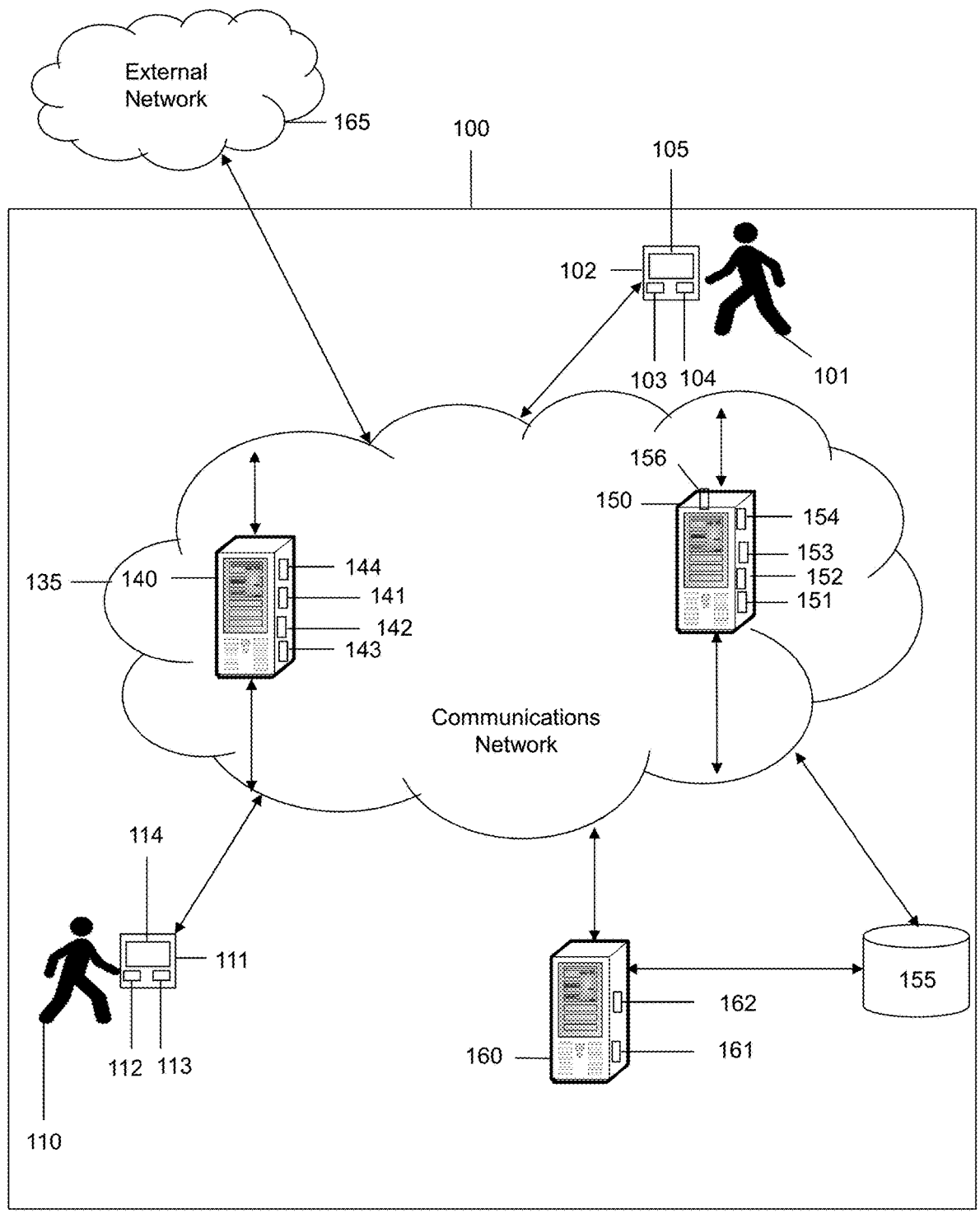
FIG. 1 is a schematic diagram of a system for understanding navigational semantics via hypothesis generation and contextual analysis according to an embodiment of the present disclosure.

A system 100 and accompanying methods for understanding navigational semantics via hypothesis generation and contextual analysis are disclosed. Navigational semantics may be constraints in the context of the present disclosure and the hypotheses may be the foundation of affirmative tests on a constraint. Notably, the system 100 and accompanying methods may be utilized to utilize data and textual information obtained from outputs of a software application, internal documents, external documents, hierarchical and/or graphical models, other information sources, or a combination thereof, to determine or infer the proper constraints across complex parameters and/or across related parameter fields to allow for the successful navigation, exercise, and/or testing of the software application (e.g. application under evaluation 230). In particular, the system 100 and methods provide for the state and/or transition constraint exploration based upon the natural language context of associated labels and correlated internal and/or external document sources. In order to accomplish the foregoing, the system 100 and methods may correlate labels, help text, menus, error messages, audio alerts, multimedia training materials, and other information, which may be displayed by the software application with the field, order of operations, and/or transition constraints of interest associated with a software application. Additionally, the system 100 and methods may correlate information from one or more internal and/or external document sources with the field, the order of operations, and/or transition constraints of interest associated with the software application.

Based on the correlations, the system 100 and methods may include performing natural language processing on textual information extracted from the correlated application data and associated internal and/or external document information to generate one or more constraints for the field, the order of operations, and/or the transitions of the software application. In certain embodiments, the constraints may include a confidence value, which may be based on a variety of factors. In certain embodiments, the confidence value may be based on the strength of the correlation or association between the processed information and the field, order of operations, and/or transitions of the software application, the quality of the natural language processing of the textual and contextual information, the source of the textual information (e.g. the system may trust one source (e.g. an internal API document) over another source (an online source or internet document) and thus having a higher confidence value for the API document source), the number of reinforcing and/or conflicting sources of constraint information, constraint complexity (e.g. how many relationals are there (e.g. ANDs, ORs, other relationals, etc.)), any other factor, or a combination thereof. In certain embodiments, the constraints may include, but are not limited to, types of values for fields and/or parameters of the software application (e.g. the input field is a dollar-denominated field, the output field is true), appropriate default values for the fields and/or parameters (e.g. a zero dollar value may be assumed for an input field when no value is explicitly required), appropriate formatting settings for the values for the fields and/or parameters (e.g. the values are real numbers to two decimal points of precision), appropriate constraints on the fields and/or values (e.g. values must be between 0.00 and 100.00, the error message must be "red"), the order in which operations should be performed in the software application (e.g. which input fields of the software application are to be filled and in what order, and/or which fields are required or optional), any other type of constraint-related information, or a combination thereof. In certain embodiments, the system 100 and methods may include merging or combining constraints if the information extracted from the various sources of information indicate that the constraints are compatible, related to each other, depend on one another, or a combination thereof, to adjust a confidence value, to simplify and combine constraint(s), or to generate complex or relational constraints (e.g. a relational constraint having a requirement that a first field have a value that is less than the value contained in a second field). In certain embodiments, the system 100 and methods may include simplifying merged and/or combined constraints. In certain embodiments, the system 100 and methods may include detecting, based on analyzing the information provided by the various information sources, potential and/or actual defects in constraints or conflicts between constraints, desired constraints, or a combination thereof.

The system 100 and methods may also include conducting hypothesis testing to increase the initial confidence value provided for the constraint. In certain embodiments, the resulting increased confidence value may be utilized according to the system 100 and methods to keep or discard the constraint, or prioritize the constraint over other constraints—either existing or suggested. The system 100 and methods may utilize a learning engine 226 to assist in refining, over time, the models or parameters associated with the determining of constraints, the models or parameters associated with determining confidence values, and/or confidence values for constraints as new information is obtained from information sources, as new information is obtained from the results of natural language processing of textual information received from the information sources, and/or new information is received from the software application being tested itself. In certain embodiments, the learning engine 226 of the system 100 may identify and flag a data source or a collection of data sources, for which the constraint hypotheses generated from the data source or collection of data sources have failed. The learning engine 226 may keep a history of the results of hypothesis tests, and over time be able to learn which learning sources were the most accurate. For example, a first source may be 99% accurate and a second source may only have 33% accuracy. Therefore, the learning engine 226 may prefer the more accurate source if it ever needs to "break a tie" between two constraints, or if there are limited system resources, it may only use constraints from the accurate source, and not waste system resources with the less accurate source. In certain embodiments, the history of the hypothesis tests may be kept with each constraint (e.g. as metadata) as they are defined and/or generated by the system 100. In certain embodiments, the constraints and/or related confidence values may be utilized to represent the software application being evaluated. In such embodiments, the constraint information may be utilized to successfully navigate or exercise the software application being evaluated. In another embodiment, the system 100 and methods may include utilizing the constraints and/or related confidences to represent the desired or even intended functionality of the software application. In such an embodiment, the system 100 and method may utilize the constraint information to support the autonomous testing of the software application being evaluated.

In certain embodiments, a softmatch method or function may be employed to correlate a potential constraint source with a target field of the application under evaluation, an order of operations of the application under evaluation, a transition of the application under evaluation, or a combination thereof. In certain embodiments, the softmatch method or function generates correlations, i.e. matches, where there may be some degree of uncertainty as to the correlation strength between the source and the target. In certain embodiments, the softmatch result may be computed from the application of one or more correlation similarity methods and may incorporate multiple pieces of data, text, concepts or constraints from the source or the target. In some embodiments, the softmatch may also utilize machine learning techniques to learn what constitutes high or low confidence matches over time, utilizing supervised learning results and/or the dynamically generated results of constraint hypothesis testing. In some embodiments, the confidences generated by the softmatch results, which constitute a match may return a normalized confidence value less than 1.0, where normalized match confidences values may range between 0.0 and 1.0). Where an explicit hard link between a constraint and a target field often requires manual generation, and where a hard link is often brittle, i.e. breaks under minor changes to the application under evaluation or its related documents, the softmatch may provide for the autonomous generation of correlations reflective of the present state of the application under evaluation 230 and related documents. Besides confidence, in some embodiments, the softmatch may be composed by having at least two similarity confidences computed. For example, a proximity check may determine that a source and target may be correlated based on their proximity to each other within the application under evaluation 230. Additionally, a comparison of parsed text extracted from the source data and target data may result in a natural language processing similarity score indicative of a correlation between the textual content of the source and target. In an embodiment of the system 100, the softmatch may merge two or more individually determined correlations into a combined score. In different embodiments, the combined score may be generated as an average, a weighted average, a min or max of the contributors, the score resulting from the most trusted source, a machine learned weighting, a normalized linear combination, a normalized non-linear combination, another method, or any combination thereof. Notably, such enhancements and features reduce processor, memory, and network resource usage. Moreover, such enhancements and improvements more efficiently and effectively determine the proper constraints across various parameters and the proper hypotheses and tests to allow for the successful navigation, exercise, and/or testing of the software application when compared to existing testing systems.

As shown in FIGS. 1-7, a system 100 and method 600 for providing autonomous discovery of field and/or navigation constraints are disclosed. Notably, the system 100 may also be utilized to autonomously test a computing system as is described in further detail in U.S. patent application Ser. No. 15,905,362, filed on Feb. 26, 2018, which is incorporated by reference in its entirety. The system 100 may be configured to support, but is not limited to supporting, natural language processing services, machine learning services, data and content services, artificial intelligence services, computing applications and services, cloud computing services, internet services, satellite services, telephone services, software as a service (SaaS) applications and services, computing testing services, software testing services, hardware testing services, mobile applications and services, platform as a service (PaaS) applications and services, web services, client servers, and any other computing applications and services. The system 100 may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be any type of user that may desire to have content, such as text or other content, to be parsed by a natural language processing system, such as natural language processing engine 143, and to determine constraints for fields of an application, constraints relating to an order of operations to be conducted by the application, and/or constraints for transitions occurring in the application (e.g. from one state of the application to another state). Additionally, the first user 101 may desire to have hypotheses associated with the constraints generated by the system 100 and/or tests for testing the hypotheses generated by the system 100 so that the constraints and/or hypotheses may be validated. In certain other embodiments, the first user 101 may be any type of user that may potentially desire to test one or more software applications created by the first user 101, created for the first user 101, under the control of the first user 101, being modified by the first user 101, associated with the first user 101, or any combination thereof. For example, the first user 101 may have created a software application that has functional features that manage, modify, and store human resource information for employees of a business. Of course, the system 100 may include any number of users and any amount of text may be parsed and any number of software applications and/or any number and/or any type of functional features may be tested.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100 itself. In certain embodiments, the first user device 102 may include components that provide non-visual outputs. For example, the first user device 102 may include speakers, haptic components, tactile components, or other components, which may be utilized to generate non-visual outputs that may be perceived and/or experienced by the first user 101. In certain embodiments, the first user device 102 may be configured to not include interface 105. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, in certain embodiments, the second user 110 may be any type of user that may desire to have content, such as text or other content, to be parsed by a natural language processing system, such as natural language processing engine 143, and to determine constraints for fields of an application, constraints relating to an order of operations to be conducted by the application, and/or constraints for transitions occurring in the application (e.g. from one state of the application to another state). Additionally, the second user 110 may desire to have hypotheses associated with the constraints generated and/or tests for testing the hypotheses generated so that the constraints and/or hypotheses may be validated. Similarly, the second user 110 may be any type of user that may potentially desire to test one or more software applications created by the second user 110, created for the second user 110, under the control of the second user 110, being modified by the second user 110, associated with the second user 110, or any combination thereof. In certain embodiments, the second user 110 may be a user that may desire to test an application created, controlled, and/or modified by the second user 110, the first user 101, any number of other users, or any combination thereof. For example, the application may include one or more workflow items that have been modified and/or supplemented by the first user 101, the second user 110, and/or other users. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include human resource applications, artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, gaming applications, internet-based applications, browser applications, mobile applications, service-based applications, productivity applications, video applications, music applications, social media applications, presentation applications, testing applications as described in U.S. patent application Ser. No. 15,905,362, filed on Feb. 26, 2018, software testing applications, hardware testing applications, computer testing applications, any other type of applications, any types of application services, or a combination thereof. In certain embodiments, the software applications may be applications under evaluation 230, which are described in further detail below. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, applications for interacting with testing software (e.g. as described in U.S. patent application Ser. No. 15,905,362, filed on Feb. 26, 2018), any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111. In certain embodiments, the location information may be obtained by utilizing global positioning systems of the first and/or second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those requested by applications executing on the first and second user devices 102, 111. Additionally, the servers 140, 150 may be configured to perform various operations of the static model discovery module 200, the model change management module 204, the dynamic model discovery module 206, the evaluators 220, the data transformers 232, the controller 224, the learning engine 226, the application under evaluation 230, any other component and/or program of the system 100, or a combination thereof. In certain embodiments, the server 140 may include a memory 141 that includes instructions, and a processor 142 that executes the instructions from the memory 141 to perform various operations that are performed by the server 140. The processor 142 may be hardware, software, or a combination thereof.

In certain embodiments, the server 140 may include a natural language processing engine 143, which may be comprised of hardware, software, or a combination thereof. The natural language processing engine 143 may include one or more modules and/or components including, but not limited to, a controller, one or more semantic libraries and/or databases, and/or one or more graph databases. In certain embodiments, the natural language processing engine 143 may reside and/or execute in the communications network 135 (such as in servers 140 and/or 150), the server 160, the first and/or second users devices 102, 111, any other component or device of the system 100, or any combination thereof. Illustratively, natural language processing engine 143 is shown as residing in server 140. In certain embodiments, the natural language processing engine 143 may reside in the external network 165, in other components of the system 100, and/or in any other desired system. In certain embodiments, the natural language processing engine 143 may be an off-the-shelf natural language system that has been enhanced by the functionality and features as described herein for the system 100, the method 600, and/or otherwise. In certain embodiments, the functionality and features provided by the system 100 and/or method 600 may be utilized to enhance componentry within an off-the-shelf natural language processing system and/or componentry external to the off-the-shelf componentry of the natural language processing system that facilitates the operation of the natural language processing system. In certain embodiments, the natural language processing engine 143 may be software-as-a-service accessed by the system 100, such as a service provided by the external network 165.

Notably, the natural language processing engine 143 may utilize, include, and/or incorporate the functionality of any existing natural language processing system. In certain embodiments, content, such as but not limited to text content, media content (e.g. image content, video content, etc.), text derived from audio content, any type of content, or any combination thereof, may be preprocessed by the system 100 to extract text from the content. The extracted text may then be fed to the natural language processing engine 143 for further processing. For example, the natural language processing engine 143 may utilize one or more natural language processing techniques to analyze the extracted text to determine a context associated with the text, relationship between words and/or groups of words in the text, meaning in the text, an intent of the text, a sentiment of the text, or any combination thereof. In certain embodiments, system 100 and/or the natural language processing engine 143 may be configured to include functionality to comprehend human language and/or speech, text in digital documents, text extracted from media content in digital files, text extracted from any type of audio content, text extracted from virtual reality content, text extracted from augmented reality content, any other comprehendible and/or parseable text, or any combination thereof. For example, the natural language processing engine 143 may be configured to comprehend human language and/or speech text that is spoken, written, symbolized, or a combination thereof, and may be configured to determine contextual information associated therewith. In certain embodiments, the system 100 and/or the natural language processing engine 143 may be configured to directly extract text from content without having the content being preprocessed first.

In certain embodiments, the natural language processing engine 143 may be configured to analyze and/or parse text (or other content and information) extracted from content included in inputs provided by any of the devices and components in the system 100, text extracted from content existing and/or accessible on the first and/or second user devices 102, 111, text extracted from content on any of the devices of the system 100, text extracted from content from any source external to the system 100 (e.g. external network 165), text extracted from content that has been scanned or otherwise uploaded into the system 100, text extracted from documents, text extracted from pictures, text extracted from video, text extracted from audio, or any combination thereof. The natural language processing engine 143 may apply and utilize natural language processing analysis techniques and/or rules to the text and/or content parsed by the natural language processing engine 143. Natural language processing techniques include but are not limited to n-gram, bag-of-words, co-referencing, part-of-speech tagging, stemming or lemmatizing, sentence breakdown, parsing, regular expression matching, subject or terminology extraction, relationship extraction, question and answer, similarity, annotating, rewriting, summarizing, sentiment analysis, intent analysis, statistical processing, machine learning, rules-based, algorithmic, translation, semantic, word embedding, concept extraction, other natural language understanding techniques, or any combination thereof. For example, in certain embodiments, the natural language processing engine 143 may be configured to utilize its analysis techniques and/or rules to consider the context and meaning of words, phrases, sentences, paragraphs, or other groupings of words extracted from inputs or sources of information. Additionally, the natural language processing engine 143 may be configured to determine the context and relationship of each word and/or group of words in an input to other words and/or groups of words in the same input and/or other different inputs or sources of information. In certain embodiments, the natural language processing engine 143 may be utilized to determine if text and/or content parsed from a particular input corresponds, relates, and/or matches with text and/or content existing in the system 100, such as in software code or documents associated with an application under evaluation 230 by the system 100, application pages and/or web pages, documents and files in the database 155, and documents, programs, and files utilized, provided, received and/or stored by the internal data sources 201, the external data sources 202, the static model discovery module 200, the model change management module 204, the dynamic model discovery module 206, the agglomerated models 208, the evaluators 220, the data transformers 232, the outputs 240, the controller 224, the learning engine 226, or any combination thereof.

In certain embodiments, the natural language processing engine 143 may process and/or store media content, such as photographs, video content, audio content (e.g. audio recording corresponding to the text, for example), augmented reality content, virtual reality content, and/or any other information in association with terms, concepts, keywords, and/or identifiers (e.g. such as in semantic libraries) so that when such terms, concepts, keywords, and/or identifiers are encountered on a subsequent occasion, the natural language processing engine 143 may rapidly detect the terms, concepts, keywords, and/or identifiers. In certain embodiments, the natural language processing engine 143 may determine associations and similarities between the parsed text and content obtained from a document source with terms, concepts, keywords and/or identifiers stored in the system 100, such as by recognizing patterns in the attributes that correspond to the text and content, by determining synonyms, similarities, antonyms and/or dissimilarities for the text and/or content, by recognizing images and/or video (or other content) having similarities to the media content stored in the system 100, by performing any other natural language processing capabilities, or any combination thereof.

The controller of the natural language processing engine 143 may serve as the component of the natural language processing engine 143 that controls the functions and operations of the natural language processing engine 143. In particular, the controller may be configured to direct the natural language processing engine 143 to parse text and/or content from an input provided by a source (e.g. document file), analyze the parsed text and/or content for concepts and keywords, determine whether the parsed text and/or content match and/or correlate with concepts, keywords, content, terms, and/or identifiers from various document sources, and/or perform any of the other operations of the natural language processing engine 143. In certain embodiments, the controller may be configured to pass the parsed text and/or content through a series of semantic libraries so as to determine an initial set of potential concepts, words, keywords, content, and terms related to the parsed text and/or content in the input. Additionally, the controller may utilize any number and/or any type of natural language processing algorithms to facilitate in this process. In certain embodiments, the concepts, keywords, content, and terms of the semantic libraries may be related to the parsed text and/or content based on the concepts, keywords, content and terms of the semantic libraries having words, letters, or sounds in common with the parsed text and/or content, based on the keywords, content, and terms being in a same subject matter area of the parsed text and/or content, based on the concepts, keywords, content and terms being typically used in conjunction with the terms used in the parsed text and/or content, based on the keywords, content, and terms having any relation to the parsed text and/or content, based on the concepts, keywords, content and terms matching the parsed text and/or content (e.g. matching nouns and verbs in the parsed text with terms in the libraries), or any combination thereof. The semantic libraries may incorporate any functionality and features of existing and/or traditional semantic query libraries. Additionally, the semantic libraries may be configured to include repositories of information and data, along with relationships and associations between concepts, keywords, words, content, and their meanings, to enable the controller to determine content and terms relevant and/or related to the parsed text and/or content obtained from the input. The semantic libraries may enable the controller to determine the relevant content and terms based on the intent and contextual meaning of the terms contained within the parsed text and/or content obtained from the input. In certain embodiments, the data and information contained in the semantic libraries may be structured and formatted so as to enable the controller to consider the context of the parsed text and/or content including, but not limited to, a location associated with the parsed text and/or content, an intent associated with the parsed text and/or content, variations in the parsed text and/or content, concepts associated with the parsed text and/or content, a country of origin associated with the parsed text and/or content, a language associated with the parsed text and/or content, a domain associated with the parsed content (e.g. human resources, banking, taxes, etc.), a type of grammar associated with the parsed text and/or content, any other contexts, or any combination thereof.

In certain embodiments, once the initial set of potential concepts, keywords, terms, and/or content are determined by the controller based on the passing of the parsed text and/or content through the semantic libraries, the controller may then compare the initial set of concepts, keywords, terms and/or content to a database, such as a graph database (e.g. database 155) to determine if additional terms and/or content are available and/or if more optimal terms and/or content related to the parsed text and/or content exist. The graph database utilized by the natural language processing engine 143 may incorporate any of the features and functionality of a traditional graph database, and may include additional concepts, keywords, terms, and/or content and machine instructions, media content, and/or information associated with the additional concepts, keywords, terms, and/or content. In certain embodiments, the graph database may utilize graph structures to represent and store data. Notably, the graph database may store relationships between the data and content stored within the graph database, and may store any type of data, content, and/or terms that may be utilized to assist in determining the content related to the parsed text and/or content obtained from the input. Data and content that is related to one another within the graph database may be readily retrieved by the graph database and/or system 100 based on their associations and/or correlations. In certain embodiments, the graph database may include additional concepts, keywords, content, and terms related to or associated with the parsed text and/or content that may not be contained in the semantic libraries. As a result, the graph database may serve as an additional resource for the controller to determine additional concepts, keywords, content, and terms associated with the parsed text and/or content that may be utilized by the natural language processing engine 143 for various purposes. If, based on the comparison to the graph database, additional concepts, keywords, terms, and/or content related to the parsed text and/or content obtained from the input are determined by the controller, these additional terms and/or content, along with the initial terms and/or content determined based on the semantic library comparison, may be utilized to obtain additional relevant information and/or content related to the text in the input.

In certain embodiments, the natural language processing engine 143 may be configured to parse text extracted from outputs of the application under evaluation 230. For example, the natural language processing engine 143 may be configured to parse text extracted from web pages of the application under evaluation 230, text extracted from content displayed on graphical user interfaces of the application under evaluation 230, text extracted from command line interfaces of the application under evaluation 230, such as, but not limited to, terminals or shells or API calls, including REST API calls, labels displayed and/or outputted by the application under evaluation 230 in connection with one or more fields, help text, menus, errors messages, and other information which may be outputted or inputted into the application under evaluation 230. In certain embodiments, the natural language processing engine 143 may group labels, help text, text from menus, text from errors, and other possible groups by utilizing a visual grouping algorithm, which may be employed to detect which groups of text on an output screen of the application under evaluation 230, for example, should be considered together. In certain embodiments, the grouping may be an input to more complex logic of the system 100. In certain embodiments, the natural language processing engine 143 may be configured to parse text extracted from internal and/or external document sources (e.g. internal and external data sources 201, 202), such as, but not limited to, software and/or hardware documentation and manuals, requirements (e.g. user stories), defects, tutorials, code comments, help text, release notes, and/or other sources. When parsing the text, the natural language processing engine 143 may extract meaning from the text, determine relationships between the words in the text, contextual information from the text, an intent in the text, a sentiment in the text, any other information, or a combination thereof.

The system 100, such as via the natural language processing engine 143 or other desired component of the system 100, may correlate the parsed text with one or more fields of the application under evaluation 230, an order of operations of the application under evaluation 230, and/or transitions of the application under evaluation 230 (e.g. transitioning from one state of the application under evaluation 230 to another state). Based on the correlations performed by the natural language processing engine 143, the system 100, such as via the natural language processing engine 143, may generate one or more constraint suggestions for the fields, the order of the operations, and/or the transitions of the application under evaluation 230. In certain embodiments, the system 100, such as via the natural language processing engine 143, may generate an initial confidence value for each constraint. The confidence value may indicate a percentage (e.g. from 0-100 or other desired scale) or likelihood that the constraint is accurate for the given field, order of operation, and/or transition of the application under evaluation 230. The confidence value generated for each constraint may be generated based on a strength of the correlation performed by the natural language processing engine 143, a quality of the natural language processing of the textual and contextual information, a quantity of information sources that include information that reinforces and/or conflicts with the constraint, a complexity of the constraint, any other factor, or a combination thereof.

In certain embodiments, the constraints suggested by the system 100 may include the suggested type of value for a given field and/or parameter (e.g. strings, numerical values, Boolean values, phone numbers, zip codes, any types of characters, any types of information, etc.), default values for the field and/or parameter (e.g. zero or another default value), a formatting setting for values for the field and/or parameter (e.g. precision of numbers and/or how values should appear visually), a range of acceptable values for the field and/or parameter, and/or whether a field and/or parameter is required or optional. In certain embodiments, constraints may include confidence scores and/or levels, and may include a history of hypothesis testing performed on the confidence associated with the constraint, a history of hypothesis testing feedback on the constraint resulting from the hypothesis testing, along with metadata indicating a number of times the constraint has been used, a history of confidence level changes for the constraint, how the constraint compares to other constraints, any other information associated with a constraint, tests utilized on a constraint, or a combination thereof. In certain embodiments and as an example of other styles of constraints on inputs which may be different from a "field", a constraint may limit the allowable values which may be input or output to various devices such as spoken and/or heard to and/or from an audio input (e.g. only certain frequencies or words may be accepted), viewed from and/or to a pictorial or video input (e.g. only certain motions may be accepted, or only things in a particular viewing region may be honored), or felt from and/or to a haptic or tactile device (e.g. with a joystick, only certain movements, directions, or pressures may be accepted or outputted). In addition to input values, constraints may restrict allowable output values on any field or output device. Output constraints may include restrictions on the accepted textual output, ranges on the placement of the output (e.g. output does not wrap, first output does not overlap a second output, output1 is placed under/above/left/right etc of output2, or output displayed within certain XY range(s)), ranges of valid output values, output characteristics (color, font, language, encodings, etc.), etc. In certain embodiments, a field may be an alert which pops up as a warning. In this case, the field may be the whole alert. Additionally, the constraints may indicate an order of operations to be performed with regard to the application under evaluation 230. For example, the constraint may indicate which fields need to be completed before other fields, such as to ensure effective use of the application under evaluation 230 that does not result in errors, misuse of the application under evaluation 230, or a combination thereof. Furthermore, if certain documents sources include information indicating that a particular constraint has features in common with another constraint, is related to another constraint, depends on another constraint, or has some association with another constraint, the system 100, such as via the natural language processing engine 143, may merge or combine the constraints into a complex constraint or relational constraint. For example, if the value of one field is reliant on the value of another field or parameters, the system 100 may merge the constraints accordingly. In certain embodiments, the merged constraints may be simplified by the system 100.

In further embodiments, the system 100, such as via the natural language processing engine 143 may determine and/or detect potential defects and/or conflicts associated with the constraints. For example, if text parsed from certain document sources indicates that a constraint for the application under evaluation 230 should be that the range of values for a particular field should be between 0-100 and text parsed from other document sources indicates that the constraint for the application under evaluation 230 should be 0-1000, and that the confidence value of the constraint having the range of values of 0-100 is higher than the constraint having the range of values between 0-1000, the system 100 may discard the constraint of the range of values between 0-1000 and may select the constraint having the range of values between 0-100. In certain embodiments, the system 100 may conduct hypothesis testing to increase the initial confidence value of a constraint. For example, the hypothesis test may validate that a value outside of the 0-100 range (e.g. a value of 107) is rejected even though it is within the 0-1000 range, which thereby strengthens the confidence in the 0-100 range, while simultaneously lowering the system's 100 confidence in the 0-1000 range for the constraint. A hypothesis (or hypotheses) for testing a constraint may indicate how the system 100 expects the application under evaluation 230 to operate using the constraint, along with expected outputs when input values are utilized with fields, parameters, operations, and/or transitions of the application under evaluation 230. For example, the system 100 may generate a hypothesis for a constraint and may test various input values during testing of the application under evaluation 230. If the application under evaluation 230 fails based on the input values provided according to the constraint, then the constraint confidence value may be lowered or the constraint may be discarded. However, if the application under evaluation 230 does not fail, and, instead, the input values are accepted and allow for expected functioning of the application under evaluation 230, the initial confidence value of the constraint may be increased and/or the constraint may be kept by the system 100 as a candidate constraint.

Figure 2:
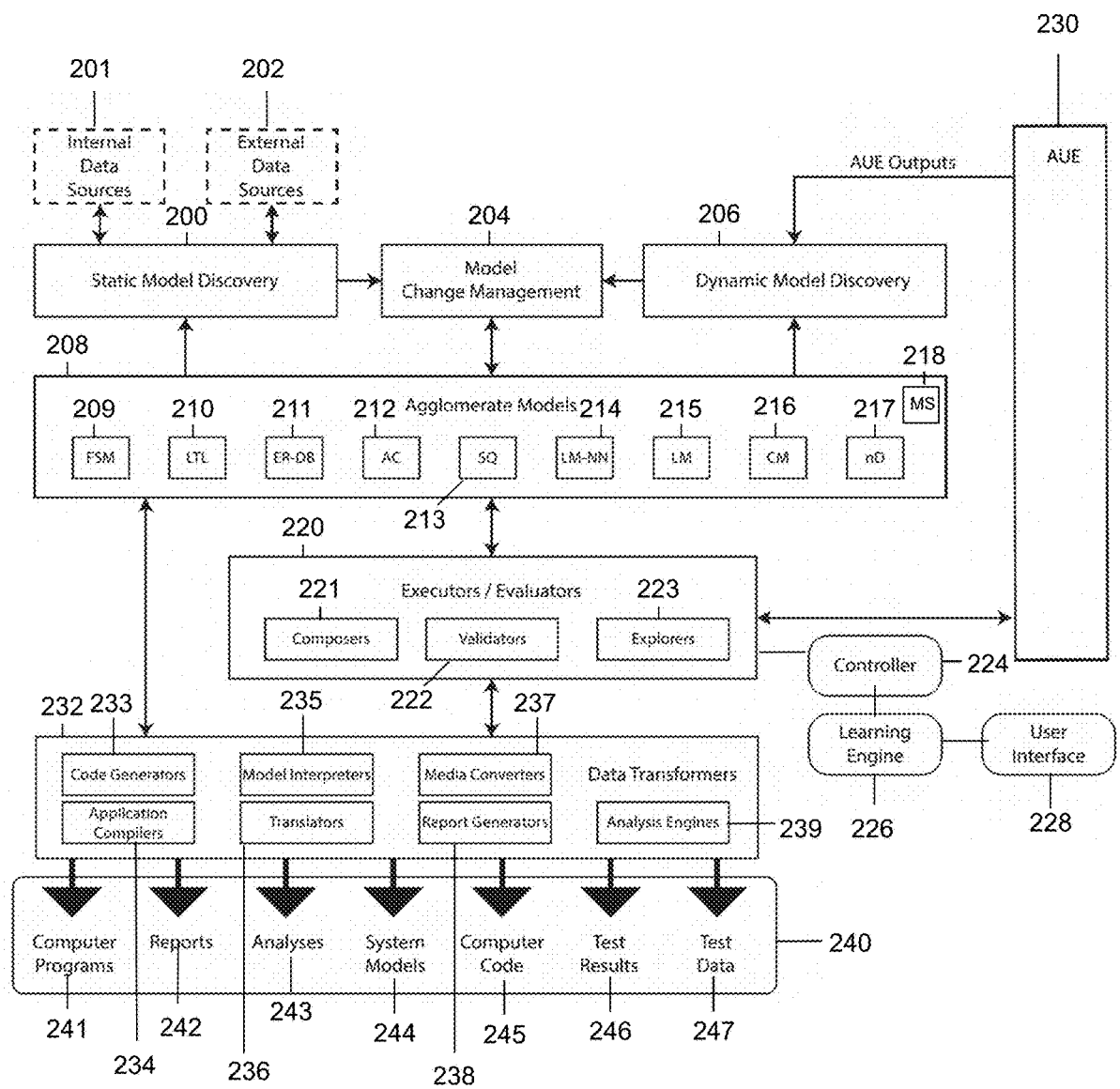
FIG. 2 is a schematic diagram illustrating various components of the system of FIG. 1, which facilitate the functional operation of the system of FIG. 1.

As the constraints generated by the system 100 are tested, the results of the tests may be fed to the learning engine 226 for further processing. In certain embodiments, the learning engine 226 may adjust the confidence levels for the constraint based on the results, may adjust confidence levels of constraints related to the tested constraints that the learning engine 226 is already familiar with or has access to, and may modify related constraints based on the results of the tests on the constraint. Additionally, in certain embodiments, the learning engine 226 may update one or more constraints utilized with the agglomerated models 208, constraints utilized with the application under evaluation 230, constraints utilized with any other components, program, and/or function of the system 100 and/or as shown in FIGS. 1 and 2. The learning engine 226 may also provide instructions to the components of the system 100, such as the natural language processing engine 143, to adjust a manner in which the constraints are determined going forward for the application under evaluation 230, applications other than the application under evaluation 230, or a combination thereof.

Additionally, as the constraints generated by the system 100 are tested, the results may also be fed to the executors/evaluators 220 of the system 100. For example, the results may be fed to the validators 222, which may be configured to evaluate the hypotheses generated by the system 100 and/or validate the tested constraints. In certain embodiments, the validation may be conducted by verifying that values inputted into the application under evaluation 230 that are outside of the constraint (or contrary to the constraint) are not allowed by the application under evaluation 230. In certain embodiments, validation may be conducted by verifying the constraints relating to formatting of values for fields. For example, if the system 100 attempts to input a value in a field of the application under evaluation 230 that has a precision outside the formatting of the constraint and the application under evaluation 230 returns an error, the constraint may be validated.

In certain embodiments, the server 140 may include a part-of-speech tagger 144, which may be software, hardware, or a combination thereof. In certain embodiments, the part-of-speech tagger 144 may reside within the natural language processing engine 143, be a companion program of the natural language processing engine 143, or be a separate program from the natural language processing engine 143. The part of speech tagger 144 may be a software program and/or function that may be configured to tag parts of speech for each word in a particular input. In certain embodiments, the part-of-speech tagger 144 may analyze text in an input, such as a sentence, and may attempt to assign, tag, and/or mark a part of speech for each word in the input. For example, the part-of-speech tagger 144 may label words in the input as nouns, verbs, adjectives, adverbs, prepositions, articles, direct objects, indirect objects, subjects of sentences, actions of sentences, and/or any other desired part of speech. The natural language processing engine 143 and/or the part-of-speech tagger 144 may be configured to perform substantive operations conducted by the system 100.

Much like server 140, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof. The server 150 may also include a knowledge engine 153, which may be software, hardware, or a combination thereof. In certain embodiments, the knowledge engine 153 may reside within the natural language processing engine 143, be a companion program of the natural language processing engine 143, or be a separate program from the natural language processing engine 143. In certain embodiments, the knowledge engine 153 may reside in server 140 or another component of FIG. 1 or 2, and/or may be integrated into any other program and/or component of the system 100, such as, but not limited to, any component of FIG. 2, the hypothesis tester 154, the part-of-speech tagger 144, the constraint solver 156, etc. In certain embodiments, the knowledge engine 153 may access and/or store source data, concepts, models (e.g. agglomerated models 208 and/or hierarchical and/or graphical representations of functionality of an application under evaluation 230), and information obtained from the internal data sources 201, external data sources 202, the application under evaluation 230, any component of FIGS. 1 and 2, or combination thereof. Additionally, the knowledge engine 153 may interact and integrate with the natural language processing engine 143 and may receive the outputs of the analyses and interpretations conducted by the natural language processing engine 143. Based on the information accessed and/or stored therein, the knowledge engine 153 and/or the natural language processing engine 143 may generate constraint suggestions for fields of an application under evaluation 230, an order of operations for the application under evaluation, and/or transitions for an application under evaluation 230. Additionally, the knowledge engine 153 may determine types of values of fields and/or parameters, and/or any other information for a constraint and/or values for a constraint.

The server 150 may also include a hypothesis tester/constraint resolution engine 154. The hypothesis tester 154 may be software, hardware, or a combination thereof. In certain embodiments, the hypothesis tester 154 may reside within the natural language processing engine 143, be a companion program of the natural language processing engine 143, or be a separate program from the natural language processing engine 143. In certain embodiments, the hypothesis tester 154 may reside in server 140 or another component of FIG. 1 or 2, and/or may be integrated into any other program and/or component of the system 100, such as, but not limited to, any component of FIG. 2, the knowledge engine 153, the part-of-speech tagger 144, the constraint solver 156, etc. The hypothesis tester 154 may generate hypotheses from constraints generated by the system 100, and one or more tests for testing the hypotheses, such as with the application under evaluation 230. In certain embodiments, the hypothesis tester 154 may store hypotheses, and/or generate new hypotheses as new information is being processed by the system 100. In certain embodiments, the new hypotheses may be generated based on the results of previous hypotheses tested by the system 100. The hypothesis tester 154 may also resolve conflicts between constraints and determine compatibilities between constraints, such as for merging the constraints to form a generalized and/or complex and/or relational constraint. When testing hypotheses, the hypothesis tester 154 may determine input values for testing the hypotheses associated with the constraints and test the input values in the constraints to either validate or reject the hypotheses. In certain embodiments, the hypothesis tester 154 may modify hypotheses and/or hypotheses tests based on the feedback generated in the system 100 based on the tests results of the hypotheses tests.

In certain embodiments, the server 150 may also include a constraint solver 156. The constraint solver 156 may be software, hardware, or a combination thereof. In certain embodiments, the constraint solver 156 may reside within the natural language processing engine 143, be a companion program of the natural language processing engine 143, or be a separate program from the natural language processing engine 143. In certain embodiments, the constraint solver 156 may reside in server 140 or another component of FIG. 1 or 2, and/or may be integrated into any other program and/or component of the system 100, such as, but not limited to, any component of FIG. 2, the hypothesis tester 154, the part-of-speech tagger 144, the knowledge engine 153, etc. In certain embodiments, the constraint solver 156 may independently or jointly with the hypothesis tester 154 generate a set of test cases to validate the hypotheses generated by the system 100. In certain embodiments, the constraint solver 156 may create a set of solutions for both the constraint and also the negation of the constraint.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160, or any combination thereof. In certain embodiments, the database 155 may store a record of any and all information obtained from any data sources utilized by the system 100 to facilitate the operative functions of the system 100 and its components, store any information and data obtained from the internal and external data sources 201, 202, store the agglomerated models 208, store outputs generated by an application under evaluation 230, store feedback received from the first and second users 101, 110, the first and second user devices 102, 111 and/or other components of the system 100, store inputs entered into or utilized to interact with the application under evaluation 230, store software code 245 generated by the system 100, store reports 242 generated by the system 100, store analyses 243 generated by the system 100, store test results 246 generated by the system 100, store test data 247, store media content, store any information generated and/or received by the system 100, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, a username, a password, contact information, demographic information, psychographic information, an identification of applications used or associated with the individual, any attributes of the individual, any other information, or a combination thereof. Device profiles may include any type of information associated with a device, such as, but not limited to, operating system information, hardware specifications, information about each component of the device (e.g. sensors, processors, memories, batteries, versions, etc.), attributes of the device, any other information, or a combination thereof.

In certain embodiments, the database 155 may store algorithms and software facilitating the operation of the natural language processing engine 143, the part-of-speech tagger 144, the knowledge engine 153, the hypothesis tester 154, the constraint solver 156, the learning engine 226, the controller 224, the user interface 228, the agglomerated models 208, the evaluators 220, the data transformers 232, the static model discovery module 200, the model change management module 204, the dynamic model discovery module 206, the application under evaluation 230, the system 100 itself, any software application utilized by the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. In certain embodiments, the database 155 may be configured to store dictionaries, semantic libraries for use by the natural language processing engine 143, information, text, and content obtained from outputs of the application under evaluation 230, information, text, and content obtained from document sources internal and/or external to the system 100, correlations between parsed text and fields, an order of operations associated with the application under evaluation 230, and transitions of the application under evaluation 230, constraints generated by the system 100, merged constraints, validated constraints, hypothesis testing results, tests for testing hypotheses, constraints, and/or the application under evaluation 230, confidence values and/or levels of constraints, hypotheses, and/or techniques for determining the constraints (e.g. natural language processing techniques and/or machine learning techniques), confirmations and/or rejections of constraints, hierarchical and/or graphical models of the application under evaluation 230, functions of the application under evaluation 230, any type of function, any type of program, or a combination thereof, source concepts extracted from text parsed by the system 100, any information generated by the system, or a combination thereof. Furthermore, the database 155 may be configured to process queries sent to it by any device in the system 100.

In certain embodiments, the system 100 may communicate and/or interact with an external network 165. In certain embodiments, the external network 165 may include any number of servers, databases, or other componentry, and, in certain embodiments, may be controlled by a service provider. The external network 165 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. In certain embodiments, the external network 165 may be accessed by the components of the system 100, such as the natural language processing engine 143 so that various sources of information may be consulted. For example, the natural language processing engine 143 may access resources of the external network 165 to compare information obtained from parsing text to information contained in the resources of the external network 165 to confirm analyses and interpretations made by the natural language processing engine 143 regarding the information and concepts. In certain embodiments, the external network 165 may be accessed by the components of the system 100 to obtain data and information that may potentially be utilized to discover models that may be included in the agglomerated models 208 (discussed later in this disclosure). For example, the system 100 may receive (or access) user stories, requirements, documentation, domain knowledge, existing test cases, computer software code, other data and information, or a combination thereof, provided by the external network 165 to assist in the creation and/or modification of one or more models of the agglomerated models 208. In certain embodiments, one or more components within the external network 165 may request the system 100 to test one or more of applications associated with the external network 165. In response, the system 100 may test the one or more applications and provide outputs 240 generated based on the testing to the external network 165. In certain embodiments, one or more of the models of the agglomerated models 208 may be transmitted to the external network 165.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. In certain embodiments, the software application or program may include the natural language processing engine 143 and/or the part-of-speech tagger 144. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom user interface 228 that the first user 101 or second user 110 may interact with, such as by utilizing a web browser or other program executing on the first user device 102 or second user device 111. In certain embodiments, the software application may execute directly as an installed program on the first and/or second user devices 102, 111, such as a mobile application or a desktop application. In certain embodiments, the software application may execute directly on any combination of the servers 140, 150, 160.

The software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a user interface 228 for the software application that is accessible and viewable by the first and second users 101, 110 when the software application is loaded and executed on the first and/or second computing devices 102, 111. The user interface 228 for the software application may display content for viewing by the first and/or second users 101, 110 via the first and/or second user devices 102, 111. Additionally, the user interface 228 may display functionality provided by the software application that enables the first and second users 101,110 and/or the first and second computing devices 102, 111 to interact with the software application and any modules supporting the software application's functionality. In certain embodiments, the software application may be configured to include the static model discovery module 200, the model change management module 204, the dynamic model discovery module 206, the agglomerated models 208, the evaluators 220, the data transformers 232, the learning engine 226, the controller 224, the user interface 228, the natural language processing engine 143, the part-of-speech tagger 144, the knowledge engine 153, the hypothesis tester 154, the constraint solver 156, any program or process in the system 100, or any combination thereof.

Referring now also to FIG. 2, various components of the system 100 are illustratively shown. The components of FIG. 2 may be utilized to facilitate the operation of the system 100 and facilitate the functionality of the natural language processing engine 143 and/or the part-of-speech tagger 144. In certain embodiments, the components illustrated in FIG. 2 may reside partially within communications network 135, entirely within communications network 135, entirely within the servers 140, 150, 160, partially within the servers 140, 150, 160, partially within the external network 165 (e.g. if the system 100 utilizes and/or accesses a remote natural language processing service provided by the external network 165), or any combination thereof. The system 100 may include one or more internal data sources 201. The internal data sources 201 may be data sources that contain data and information internal to the devices, processes, programs, and/or components of the system 100. The data and information included in the internal data sources 201 may include, but are not limited to, user stories, requirements, documentation, domain knowledge, existing test cases, computer software code, other data and information, or a combination thereof, which may be sources of text and content to be analyzed by the natural language processing engine 144 and/or the part-of-speech tagger 144, and may be utilized to facilitate the creation of models and/or update models utilized by the system 100, such as, but not limited to, the agglomerated models 208. User stories, for example, may comprise, but are not limited to, natural language descriptions of one or more features of a particular computing system, software application, hardware device, software feature, and/or hardware feature. Requirements may include, but are not limited to, descriptions of requirements for one or more features of a particular computing system or software application. In certain embodiments, user stories and requirements may include images, pictures, videos, sounds, and/or any type of media content that may be analyzed by one or more components of the system 100. For example, if a particular user story includes pictures, the pictures may be web screens (i.e. actual or proposed), the pictures may be of steps to take in a particular process, pictures associated with a configuration of the system 100 or another system, etc. In certain embodiments, optical character recognition (OCR) or other image recognition techniques may be utilized to obtain text from pictures or media content, and may be utilized to facilitate the system's 100 understanding of the pictures or media content. Documentation may include, but is not limited to, digital documents containing information and data, which may be parsed by the natural language processing engine 143 and/or part-of-speech tagger 144 to obtain data and information which may be of use by the system 100, such as to construct one or more of the agglomerated models 208 and to compute and/or confirm confidence in interpretations and analyses derived from analyzed text. Domain knowledge may include, but is not limited to, knowledge pertaining to a computing environment in which a particular computing system or application operates, the rules governing the domain, knowledge obtained from devices and users in the domain, user workflows, configurations and constraints utilized in the development of a software application, data pipelines, domain specific acronyms, domain specific rules, domain specific formulas, any other domain information, or a combination thereof. Test cases may be tests that the system 100 may utilize to validate and/or verify a software program, computing system, hardware, and/or any thing that may be tested by the system 100. In certain embodiments, tests may comprise natural language descriptions of steps for the system 100 to take and items to verify in order to conduct a particular test. Computer software code may comprise, but is not limited to, a set of instructions that may form a computer program that may be executed by the system 100. The software code may also be analyzed and/or tagged by the natural language processing engine 143 and/or the part-of-speech tagger 144.

In certain embodiments, the system 100 may also include one or more external data sources 202. The external data sources 202 may be data sources that contain data and information external to the devices, processes, programs, and/or components of the system 100, which may be sources of text and content to be analyzed by the natural language processing engine 144 and/or the part-of-speech tagger 144. For example, the external data sources 202 may reside in networks outside of communications network 135 and may be not directly under the control of the system 100. The data and information included in the external data sources 202 may include, but are not limited to, user stories, requirements, documentation, domain knowledge, existing test cases, computer software code, web content, media content, data from external applications, outputs from devices external to the system 100, other data and information external to the system 100, or a combination thereof, which may be utilized to facilitate the creation of models and/or update models, such as the agglomerated models 208, which are discussed in further detail below. Additionally, the data and information in the external data sources 202 may be utilized by the natural language processing engine 143 and/or part-of-speech tagger 144 to confirm analyses, interpretations, and/or learning performed by the system 100. In certain embodiments, the data and information from the internal and external data sources 201, 202 (e.g. user stories, requirements, documentation, etc.) may be written and/or provided in natural language, in various natural language translations, and in various encodings. In certain embodiments, the data and information from the internal and data sources may be in provided in visual form (e.g. pictorially), in audible form, in source code, in pseudo-code, in virtual form, any form, or any combination thereof. In certain embodiments, the data and information may be in release notes, help files, and/or in other types of documents.

The system 100 may include a static model discovery module 200, which may be a software module executing within a software application that conducts the operations of the system 100. In certain embodiments, the static model discovery module 200 may comprise a combination of hardware and software. The static model discovery module 200 may perform processes associated with discovering model information from the internal and external data sources 201, 202, which may be utilized to generate one or more models of the agglomerated models 208. The models may comprise representations of systems, programs, functions, processes, or any combination thereof, which may be utilized as a basis for comparison to a computing system, program, application, and/or function to be analyzed and/or tested by the system 100. Model data extracted by the static model discovery module 200 from static sources, such as the internal and external data sources 201, 202 may contribute to the efficient and dynamic discovery of models associated with an application under evaluation 230. In certain embodiments, the static model discovery module 200 may be configured to discover model information from the internal and external data sources 201, 202 that does not generally change based on interactions between the system 100 and a particular application under evaluation 230. In certain embodiments, new documents from the internal and external data sources 201, 202 may be inserted and utilized at any time. In certain embodiments, a new document may include a new version of a previous document utilized by the static model discovery module 200. As a result, while a particular document may be static, the number of documents may not be. The static model discovery module 200 may be configured to recursively and continuously enhance model information extracted from the internal and external data sources 201, 202 through the use of agglomerated models 208 that have been developed from earlier static and dynamic model discovery, executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

In certain embodiments, the system 100 may include a model change management module 204, which may be a software module executing within a software application that conducts the operations of the system 100. In certain embodiments, the model change management module 204 may comprise a combination of hardware and software. The model change management module 204 may perform processes associated with modifying and/or updating agglomerated models 208 based upon static and dynamic discovery processes conducted by the static model discovery module 200 and the dynamic model discovery module 206, which is discussed in further detail below. In certain embodiments, the model change management module 204 may modify one or more models of the agglomerated models 208 specifically when source concepts extracted from the static and dynamic discovery processes are of a threshold confidence level or are within a range of confidence levels. In certain embodiments, the module change management module 204 may be configured to resolve conflicts and manage issues that may arise from simultaneous and asynchronous static and dynamic discovery. For example, if information obtained from a static discovery process performed by the static model discovery module 200 conflicts with information obtained from a dynamic discovery process performed by the dynamic discovery module 206, the model change management module 204 may arbitrate which information should be utilized to update the agglomerated models 208, which information should be excluded from updates to the agglomerated models 208, and which information should be modified prior to inclusion into the agglomerated models 208.

As indicated above, the system 100 may include a dynamic model discovery module 206, which may be a software module executing within a software application that conducts the operations of the system 100. In certain embodiments, the dynamic model discovery module 206 may comprise a combination of hardware and software. The dynamic model discovery module 206 may perform processes associated with discovering model information from a specific application under evaluation 230 that is being tested, analyzed, and/or explored by the system 100. For example, the dynamic model discovery module 206 may discover model information used to generate new models for the agglomerated models 208 or update existing models in the agglomerated models 208 based on information and data gathered from outputs generated based on interactions between the system 100 and the application under evaluation 230 being tested by the system 100. In certain embodiments, the dynamic model discovery module 206 may represent the model extraction component of the system 100 associated with interactions and hypothesis testing driven by evaluators 220 on the application under evaluation 230. In certain embodiments, the dynamic model discovery module 206 may recursively and continuously enhance model information extracted from interactions between the system 100 and the application under evaluation 230 through the use of agglomerated models 208 developed from earlier static and dynamic model discovery (i.e. previously conducted static and dynamic model discovery), executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

The system 100 may include a set of agglomerated models 208. In certain embodiments, the models may comprise representations of systems, programs, functions, processes, information, data, or any combination thereof, which may be utilized as a basis for comparison to a computing system, program, application, and/or function to be analyzed, and/or explored, and/or tested by the system 100. For example, a model of the agglomerated models 208 may be utilized by a software application performing the operations of the system 100 to determine whether a particular application under evaluation 230 has any defects, conflicts, or other issues based on a comparison of the model to one or more functions, features, and/or states of the application under evaluation 230. The agglomerated models 208 may include models contributed to or generated from an application under evaluation 230, and may be utilized to interpret unstructured and incomplete information obtained from the internal data sources 201, external data sources 202, the application under evaluation 230, any other source, or any combination thereof. For example, the agglomerated models 208 may be utilized to interpret information from JIRAs, application programming interface documents, user stories, code comments, requirements, release notes, tutorials, help texts, error messages, alerts, any other information, or any combination thereof. The agglomerated models 208 may be modified, updated, removed, replaced, or otherwise changed by the model change management module 204, and may be created based on information and data obtained from the internal and external data sources 201, 202 by the static discovery model module 200 and/or by information gathered from interactions by the system 100 with the application under evaluation 230 and/or other applications that have been already evaluated or will be evaluated in the future.

The agglomerated models 208 may include any type of model that may be utilized to perform the functionality provided by the system 100, and may represent data and information common to the operation of the system 100 across all applications under evaluation 230, within common domains of the applications under evaluation 230, and in representation of a single application under evaluation 230. For example, the agglomerated models 208 may include, but are not limited to, finite state machine (FSM) models 209, linear temporal logic (LTL) models 210, entity relationship/database (ER-DB) models 211, activity (AC) models 212, sequence (SQ) models 213, learning model/neural network (LM-NN) models 214, language (LM) models 215, conceptual (CM) models 216, n-Dimensional physical (nD) models 217, mathematical models (MS) 218, petri nets, any other models, or any combination thereof. In certain embodiments, the FSM model 209 may be an abstract, mathematical model of computation that may be in exactly one of a finite number of states at any given time. The FSM model 209 may be defined by a list of its states, its initial state or states, and the conditions for each transition. In certain embodiments, the LTL models 210 may comprise modal temporal logic models with modalities that refer to time. The ER-DB models 211 may be composed of entity types, which classify things of interest, and may specify relationships that may exist between instances of the entity types. In certain embodiments, the ER-DB models 211 may be models associated with the graph databases disclosed in the present disclosure and otherwise. In certain embodiments, entity relationships in the ER-DB models 211 may describe interrelated things of interest within a specific domain of knowledge. In certain embodiments, the ER-DB models 211 may represent the relations in a relational database. The AC models 212 may represent workflows of stepwise activities and actions with support for choice, iteration, and concurrency, such as with respect to activities conducted within an application being tested (e.g. application under evaluation 230). The SQ models 213 may be models that capture how objects in an application operate with one another and in what order.

The LM-NN models 214 may refer to a broad class of models that may be utilized in machine learning applications and/or artificial intelligence applications. In certain embodiments, the LM-NN models 214 may be trained based on internal and external feedback received by the system 100. Such feedback may relate to hypothesis testing, user feedback, and/or any other feedback received by the system 100. The LM models 215 may be probability distributions over sequences of words. For example, give a particular sequence of length m, a LM model 215 may assign a probability $P(w_1, \ldots, w_m)$ to the whole sequence. In certain embodiments, the LM models 215 may refer to a variety of models built over text, such as part of speech tagging, lemmatizing, parsing, regular expression matching, annotating, summarizing, rewriting, along with other techniques. The CM models 216 may be representations of systems, which may be made of the composition of concepts that are utilized to help, know, understand and/or simulate an application or domain concept. The CM models 216 may also include relationships amongst the various concepts. The nD models 217 may be models, which represent the geometric relationship of modeled components, and, in the case of dynamic physical models, their interactions. In certain embodiments, the nD models 217 may be linear (i.e. one-dimensional), planar (i.e. two-dimensional), spatial (i.e. three-dimensional), and/or multi-dimensional (i.e. n-dimensional). The MS models 218 may be models, which are mathematical and/or statistical models. For example, a sample MS model 218 may be a Bayesian network model.

The system 100 may include a plurality of evaluators 220 (can also be executors 220), which may be one or more software modules executing within a software application that conducts the operations of the system 100. In certain embodiments, the evaluators 220 may comprise a combination of hardware and software. The evaluators 220 may comprise a plurality of processes that generate data and information based on their interactions with a given application under evaluation 230. In certain embodiments, there may be several types of evaluators 220. A first type of evaluator 220 may be a composer 221, which may be configured to execute a series of steps on the application under evaluation 230 to generate results, which may be composed into one or more outputs. In certain embodiments, the composer 221 may execute a set of steps on the application under evaluation 230, while capturing screenshots or screen outputs for conversion into a media content video by a data transformer 232 of the system 100. For example, the media content video may be a training video to assist a user with navigating through various features and functions of the application under evaluation 230. As another example, the media content may be a problem recreation and/or debugging video to assist a developer or tester to debug a problem with the application under evaluation 230. In this scenario, the problem creation and/or debugging video may document the steps to recreate the problem that occurred in the application under evaluation 230 so that the developer or tester may readily perceive and/or visualize how the problem occurred. As yet another example, the media content may be a test verification video for facilitating the historical verification of tests for auditing purposes. When the test verification video is being utilized for auditing the verification of tests that have been run, the test verification video may be a video that proves that a test was executed and that the test was passed by the application under evaluation 230. Notably, any other media content may be generated by the composer 221 for any suitable and/or desired purpose as well. In certain embodiments, a composer 221 may execute a series of steps on an application under evaluation 230, while capturing statistical information, which may be utilized by an analysis engine 239 to generate analyses 243. In certain embodiments, a composer 221 may be configured to observe inputs into the application under evaluation 230 and outputs generated from a validator 222 and/or explorer 223 and generate composed output results. A second type of evaluator 220 is a validator 222, which may be configured to execute a series of steps on the application under evaluation 230 test-modeled functionality and/or to evaluate hypotheses generated by the system 100 as they relate to the functionality of the application under evaluation 230. The validators 222 may assist in developing high confidence agglomerated models 208 based on the series of steps executed or otherwise. In certain embodiments, the system 100 may require zero or more validators 222 to operate because trivial or special use cases exist where sufficient model confidence may be obtained without utilizing the functionality of the validators 222. A third type of evaluator 220 is an explorer 223, which may be configured to execute a series of steps on an application under evaluation 230 to dynamically explore and model the application under evaluation 230 in conjunction with the dynamic model discovery module 206. In certain embodiments, the explorers 223 may assist in the discovery and creation of models corresponding to the application under evaluation 230, correlating with one or more functions and/or features of the application under evaluation, or a combination thereof.

The system 100 may also include a controller 224, which may be software, hardware, or a combination thereof. The controller 224 may be configured to control the application, hardware, and/or components of the system 100 that facilitate the functionality of the system 100. In certain embodiments, the controller 224 may govern the high-level behavior of the system 100 itself, and may be configured to start the operation of the system 100, start subsystems of the system 100, and/or stop the operation of the system 100 and subsystems. In certain embodiments, the controller 224 may manage the configuration of the system 100, along with the configuration of the application under evaluation 230. The controller 224 may also direct the flow of control or flow of data between the various modules of the system 100, such as, but not limited to, the static model discovery module 200, the model change management module 204, the dynamic model discovery module 206, the evaluators 220, the data transformers 232, any other module or software in the system 100, or any combination thereof. In certain embodiments, the controller 224 may allocate and direct computing resources within the system 100. For example, the controller 224 may allocate and direct computing resources such as, but not limited to, memory (e.g. random-access memory), processors, and/or network resources. In certain embodiments, the controller 224 may also allocate and direct virtual computing resources, such as, but not limited to, containers, virtual machines, virtual processors, virtual memory (e.g. virtual random-access memory), cloud resources, virtual networks, other virtual resources, or any combination thereof. In certain embodiments, the controller 224 may direct the priority, the level of parallelism, and/or redundancy of various components in the system 100. In further embodiments, the controller 224 may control the backup and recovery of data and information stored and/or traversing the system 100. In still further embodiments, the controller 224 may be configured to control the operation of any program, hardware, and/or system associated with the system 100.

In addition to the controller 224, the system 100 may also include a learning engine 226. The learning engine 226 may be software, hardware, or a combination thereof, and may be supported by any suitable machine learning and/or artificial intelligence algorithms. The learning engine 226 may be a system that determines patterns and/or associations in behaviors or objects, such as, but not limited to, behaviors and/or objects of an application under evaluation 230 that is being analyzed and/or tested by the system 100. The learning engine 226 may allow for improved efficiency and accuracy of the system 100, while enabling more advanced static model discovery modules 200, evaluator 220 modules, and/or data transformer 232 modules. In certain embodiments, the learning engine 226 may allow for supervised learning, which may be supported through the user interface 228 that may be accessed and interacted with by the first user 101, the second user 110, and/or n-other users. For example, the learning engine 226 may receive inputs from the first and/or second users 101, 110 that endorse one or more models, endorse one or more constraints, validate tests, perform sentence tagging in documents, etc. that may be utilized to enhance the agglomerated models 208, the operation of the system 100, and the knowledge base of the system 100. Additionally, the learning engine 226 may support unsupervised learning by automatically feeding validated test results from the evaluators 220 and statistical, performance-based, evaluator 220 results back through the system 100 as they are generated. In certain embodiments, the learning engine 226 may be configured to associate confidences or confidence levels with determined patterns and/or associations determined by the learning engine 226. Notably, the learning engine 226 may increase the confidence value of a particular pattern as the pattern is detected more frequently by the learning engine 226 over time, or lower the confidence value of the particular pattern if the pattern is contradicted in some regard or is not detected frequently over time. In certain embodiments, the confidence values may range from 0.0 to 1.0, however, any suitable scale may be utilized according to the present disclosure. In certain embodiments, the first user 101 and/or the second user 110 may be allowed to provide inputs via the first and/or second user devices 102, 111 to directly alter the confidence values. In certain embodiments, the first user 101 and/or the second user 110 may alter the confidence values via user interface 228 of the software application that performs the operative functions of the system 100. The user interface 228 may be made accessible to the first and/or second user devices 102, 111. In certain embodiments, the learning engine 226 may train or improve a model, a parameter, a weight, a dictionary, a threshold, a confidence, or a filter associated with generating a future hypothesis or constraint, wherein the training or improving is based on the feedback, the result, an internal document, an external document, the application under evaluation, a constraint similar to the constraint, a constraint related to the constraint, a merged constraint, a combined constraint, a generalized constraint, another constraint, another hypothesis similar to the hypothesis, another hypothesis related to the hypothesis, another hypothesis, a concept, a confirmation or rejection of the constraint, any other source, or combination thereof.

A sample use-case scenario may be utilized to illustrate how the first user 101 may adjust a confidence value. In this use-case scenario, the learning engine 226 may determine that each employee having an account being generated by an application under evaluation 230 has a phone number with a 0.95 confidence value. The first user 101 may review the learning engine's 226 determination and verify that the determination is accurate via an input transmitted via the first user device 102. Based on the first user's 101 verification, the learning engine 226 may increase the confidence value from 0.95 to 0.99 or even to 1.00 for an employee having a phone number. As another use-case scenario, the system 100 may determine from information gathered from the static model discovery module 200 that a user should not be able to change their date of birth in a user account created by an application. This determination, however, may be deemed as inaccurate or wrong by the first user 101. In this scenario, the learning engine 226 may alter the confidence value attributed to a user not being able to change the date of birth down to 0.01 or even to 0.00 from a higher confidence value originally determined by the learning engine 226. In contrast, the confidence value attribute to the user being able to change the date of birth may be increased by a certain amount by the learning engine 226. In certain embodiments, the verification of the learning engine's 226 determination may come from another source, such as another source of information. For example, a previous release or version of the application under evaluation 230 may have had the same or similar constraint. The finding of the same constraint in the history of the application under evaluation 230 by the system 100 may provide a level of verification and allow improvement of the confidence associated with the constraint.

The software application that facilitates the functional operations of the system 100 may include a user interface 228. The user interface 228 may be a graphical user interface, which may allow the first and/or second users 101, 110 and devices to interact with the software application performing the operations of the system 100. In certain embodiments, the user interface 228 may be a text-based terminal/command interface. The user interface 228 of the application may have both visual and auditory elements as output, and may be configured to receive keyboard inputs, mouse inputs, microphone inputs, screen inputs (e.g. touchscreen inputs) any type of inputs, or any combination thereof, from a user and/or device interacting with the user interface 228. In certain embodiments, the user interface 228 may be adapted to receive inputs and/or send outputs via user interface elements specifically configured for people with disabilities or challenging circumstances. In certain embodiments, an application programming interface (API) or software development kit (SDK) may be utilized for remote computers to connect with the system 100, and may input or output information as needed.

The system 100 may be configured to access, test, and/or interact with one or more applications under evaluation 230. An application under evaluation 230 may be a software application that the first and/or second user 101, 110 may wish to analyze and/or test by utilizing the system 100. In certain embodiments, instead of a user requesting that an application under evaluation 230 be analyzed or tested, a device, robot, and/or program may request the analyzing and testing of the application under evaluation 230. Based on interactions between the system 100 and an application under evaluation 230, information and data may be obtained to facilitate the creation of one or more models of the agglomerated models 208, the updating of one or more models of the agglomerated models 208, the verification of one or more models of the agglomerated models 208, or any combination thereof. In certain embodiments, the applications under evaluation 230 may be accessed, tested, and explored by utilizing the evaluators 220, which include the composers 221, validators 222, and explorers 223.

In certain embodiments, the system 100 may include a plurality of data transformers 232. In certain embodiments, the data transformers 232 may be software, hardware, or a combination thereof. The data transformers 232 may be configured to take one or more inputs, such as, but not limited to, the agglomerated models 208 and information and data obtained from the evaluators 220 to generate a useful output, such as by manipulating the data and information in the inputs. In certain embodiments, the system 100 may include any number of data transformers 232, which may include code generators 233, application compilers 234, model interpreters 235, translators 236, media converters 237, report generators 238, and analysis engines 239. The code generators 233 may be configured to access model inputs from the agglomerated models 208 and one or more objectives obtained from the evaluators 220, other data transformers 232, or even the code generators 233 themselves to create software code that satisfies the objectives. In certain embodiments, the software code generated by the code generators 233 may be utilized to fix a defect detected by the system 100 in an application under evaluation 230. In certain embodiments, the generated software code may be utilized to add, change, and/or remove functionality of the application under evaluation 230. In certain embodiments, the generated software code may be utilized to test or exercise the application under evaluation 230. In further embodiments, the generated code may be internal to the application under evaluation 230 or external to the application under evaluation 230, and the generated code may be related to the application under evaluation 230 or the generated code may benefit other software applications outside of the application under evaluation 230, such as applications that support the environment of the application under evaluation 230 (e.g. cloud programs, SaaS, operating systems, related applications, etc.). In certain embodiments, the generated code may be written and/or compiled by utilizing any suitable programming language, such as, but not limited to C, C++, Java, Python, and/or other language. In certain embodiments, the generated code may be generated at a high level, such as through the use of scripting languages, or low level, such as through the use of assembler/assembly languages. In certain embodiments, the generated code may be software that may enhance, replace, and/or modify the software application (including any modules) supporting the operation of the system 100. For example, the generated code may be utilized to update a start-up script based on execution patterns of the application under evaluation 230 or usage patterns of users of the application under evaluation 230.

The application compilers 234 may utilize outputs from the code generators 233 and compile the generated code into one or more computer applications/programs 241. In certain embodiments, the application compilers 234 may utilize inputs from the agglomerated models 208 and data from the evaluators 220, and incorporate such inputs and data when compiling software code. Inputs may also include compiler options, such as, but not limited to optimizations, performance goals, goals relating to the operation of the application under evaluation 230, configuration options, etc. The application compilers 234 may include target models (i.e. selected) of the agglomerated models 208 to improve directly or indirectly, such as by improving the functional features of the application under evaluation 230. The model interpreters 235 may be utilized in interpreting the models in the agglomerated models 208. In certain embodiments, the model interpreters 235 may comprise software, hardware, or a combination of hardware and software. An example use-case scenario of using a model interpreter 235 involves the use of a LM model 215. For the LM model 215, there may need to be a model interpreter 235, which is configured to understand the LM model 215 and how it relates to the application under evaluation 230, or how the application under evaluation 230 is understood by the evaluators 220. For example, the LM model 215 may tag or mark parts of speech or concepts found in paragraphs of text obtained from the internal or external data sources 201, 202, and the model interpreter 235 may be configured to comprehend the parts of speech as it pertains to the application under evaluation 230. In this case, the comprehension by the model interpreter 235 may comprise understanding an application page title, an application widget (e.g. text box, menu, pull down menu, radio button, etc.), an application user or role, an application message (e.g. alerts, emails, highlighted text, etc.), and/or any action in the application under evaluation 230 (e.g. create, read, update, delete, navigate, click, select, choose, enter, etc.)

The translators 236 may be software, hardware, or a combination thereof, and may take a model of the agglomerated models 208 or outputs from the evaluators 220, and convert them into a form that is more useful for a given task. As an example, a translator 236 may take a FSM model 209 and convert the FSM model 209 from a representation in a database 155 to a graphical representation, which may be more readily understood by the first or second user 101, 110.

For example, the states of the FSM model 209 may be represented by circles or tiles, which further represent or illustrate a portion of the specific application that they represent. In certain embodiments, transitions between states may be shown as lines, which may have effects, which may imply characteristics of the transitions. Such effects may include adjusting thickness of a line to show popularity of use, a number of paths, complexity, or any other attribute. As another example, a translator 236 may take a LM model 215 or output from the evaluators 220, and convert them from English language to another language, such as Chinese or any other desired language, and vice versa. The translators 236 may also be utilized to translate from one encoding to a second encoding, such as from ASCII to Unicode. As yet another example, the translators 236 may take a SQL database (e.g. database 155) and convert it to a NOSQL database. Any translated information, programs, content, or output from the translators 236 may be fed into the agglomerated models 208, the evaluators 220, and/or the outputs 240 for further use by the system 100.

The media converters 237 of the system 100 may be configured to utilize outputs of the evaluators 220 and the agglomerated models 208 and convert them from a first form to a second form. In certain embodiments, the media converters 237 may be software, hardware, or a combination thereof. As an example of the operation of the media converters 237, the media converters 237 may take a textual description of the application under evaluation's 230 actions and steps, and convert them into listenable audio, which may be particularly useful to those with visual impairment. For those with hearing impairment, the media converters 237 could convert audio into text or images, which may be utilized for closed caption purposes in a presentation. The report generators 238 of the system 100 may be hardware, software, or a combination thereof, and may be utilized to create reports 242 based on the outputs of models of the agglomerated models 208, outputs from the evaluators 220, outputs from the data transformers 232, outputs from the application under evaluation 230, along with any other outputs received by the system 100. As an example, the report generators 238 may generate reports 242 that include the results of test cases executed on the application under evaluation 230 by the system 100. In certain embodiments, the outputs may simplify, summarize, and/or otherwise organize the data in the outputs. The analysis engines 239 may also comprise hardware, software, or a combination thereof. The analysis engines 239 may analyze the outputs of the agglomerated models 208, the outputs of the evaluators 220, the outputs of the data transformers 232 and any other outputs received by the system 100 to take an intelligent action. An intelligent action may include identifying a noteworthy condition based on the outputs analyzed, for example. The condition may be output in an analysis 243, and, in certain embodiments, the condition may be a defect detected in a test result 246. In certain embodiments, the condition may be based on the performance, popularity, complexity, or any other metric of a state or transition of a FSM model 209.

In addition to the functionality provided by the various components of the system 100 described above, the system 100 may also generate a variety of outputs 240 based on use of the components. The outputs 240 generated by the system 100 may include, but are not limited to, computer programs 241, reports 242, analyses 243, system models 244, computer code 245, test results 246, and test data 247. The computer programs 241 may be sets of instructions, which may be executed by various components of the system 100 to perform one or more tasks. As described above, the application compilers 234 may utilize outputs from the code generators 233 and compile the generated code into one or more computer applications/programs 241. The created computer programs 241 may be utilized to supplement functionality of an application under evaluation 230, integrated into an application under evaluation 230, replace functionality of the application under evaluation 230, modify functionality of the application under evaluation 230, or any combination thereof. The reports 242 may be generated by the report generators 238 of the system 100, and the reports 242 may be generated based on the outputs of models of the agglomerated models 208, outputs from the evaluators 220, outputs from the data transformers 232 outputs from the application under evaluation 230, along with any other outputs received by the system 100. The reports 242 may combine information from the outputs in a visual format, audio format, a format understandable by those with hearing and visual impairments, or any combination thereof. As an example, a report 242 may visually show all the successful paths that the evaluators 220 were able to take while testing the application under evaluation 230, along with any defects and/or any potential conflicts detected while exploring the functionality of the application under evaluation 230. Of course, any type of report 242 may be generated by the system 100, and a report 242 may include any information generated, received, stored, transmitted, and/or manipulated by the system 100.

The analyses 243 may be a type of output 240 of the system 100, which may identify a noteworthy condition, such as a condition associated with an application under evaluation 230 (e.g. a defect or conflict), a condition associated with one or more components of the system 100, any type of condition, or any combination thereof. The condition may be output in the analysis 243, and may be generated by the analysis engines 239. The system models 244 that may be output by the system 100 may comprise an architecture and/or behavior of the system 100 or any other system that the system 100 interacts with. For example, a system model 244 may be a model that describes an architecture or behavior of the application under evaluation 230, functions and products related to the application under evaluation 230, a computing environment associated with the application under evaluation 230, and/or an application related to the application under evaluation 230. In certain embodiments, the system model 244 may be one or more models from the agglomerated models 208. The computer code 245 may be an output 240 that comprises instructions for executing a task, such as on a processor of one or more of the components of the system 100. The computer code 245 may be generated by the code generators 233 and may be compiled by the application compilers 234. In certain embodiments, the computer code 245 may be obtained from the agglomerated models 208, the evaluators 220, and/or the data transformers 232. In certain embodiments, the computer code 245 may be utilized to supplement functionality of an application under evaluation 230, integrated into an application under evaluation 230, replace functionality of the application under evaluation 230, modify functionality of the application under evaluation 230, modify functionality of modules and applications supporting the functionality of the system 100, or any combination thereof.

The test results 246 of the outputs 240 may be results of executing various software, hardware, and/or application tests on components of the system 100, the application under evaluation 230, or any combination thereof. The test results 246 may be obtained based on tests and/or analyses conducted by the validators 222, the analysis engines 239, any of the evaluators 220, and/or any of the data transformers 232. In certain embodiments, the test results 246 may include information relating to a test, such as, but not limited to, an identifier identifying the type of test executed, inputs inputted into the test, outputs generated from the test, performance metrics associated with the test, or a combination thereof. In certain embodiments, the test results 246 may indicate whether the test was successful or a failure. If a failure occurred, additional data and metadata may be included with the test results 246, such as, but not limited to, call stacks, offsets within computer programs, source code, addresses of objects (e.g. objects within the application under evaluation or other components being tested), actual objects, memory dumps, screenshots, and/or any other information that may assist with failure remediation and/or analysis. Test data 247 may be any information that pertains to the assessment of software, hardware, applications, or any combination thereof, that the system 100 interacts with. In certain embodiments, test data 247 and/or test results 246 may include results and/or data resulting from hypothesis tests conducted by the system 100 or otherwise. In certain embodiments test data 247 may include inputs and outputs of tests, executable and/or manual test steps, expected results of tests, actual results of tests, functional results of tests, performance results of tests, or any combination thereof. In certain embodiments, test data 247 may include metadata describing the tests, such as, but not limited to, how many tests exist, the priority or ordering of tests to be utilized, computer resources (e.g. memory resources, processing resources, etc.) assigned to and utilized for executing certain tests, instructions or media content (e.g. pictures, video, audio, etc.) describing the application under evaluation 230, any other information, or a combination thereof.

Operatively, the system 100 may operate according to the following exemplary use-case scenarios as described in the context of method 600 and/or as otherwise described herein. Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving and processing inputs, including hierarchical and/or graphical models of various functionality of an application under evaluation 230, text or other content obtained from various sources, such as, but not limited to, the internal and external sources 201, 202, the knowledge engine 153, the learning engine 226, any other component of the system 100, or a combination thereof; analyzing text extract from the inputs, such as by utilizing one or more natural language processing or other techniques; determining source concepts from the analyzed text; determining constraints for an application under evaluation 230 based on the analyzing and/or source concepts; generating one or more hypotheses associated with the constraint and/or one or more tests for testing the hypotheses and/or constraints; testing the hypotheses on a field, order of operations and/or transition of an application under evaluation 230; analyzing the test results of the hypothesis testing; generating feedback based on the test results; generating and/or modifying hypotheses based on the feedback and adjusting confidence levels for sources of information and/or the constraints themselves, techniques for determining the constraints; the hypotheses, the hypotheses tests, or a combination thereof; combining and/or merging constraints to form generalized constraints; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-2 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a natural language processing engine 143, a part-of-speech tagger 144, a knowledge engine 153, a hypothesis tester 154, a constraint solver 156, a server 150, a server 160, and a database 155. However, the system 100 may include multiple first user devices 102, multiple second user devices 111, multiple communications networks 135, multiple servers 140, multiple natural language processing engines 143, multiple part-of-speech taggers 144, multiple servers 150, multiple knowledge engines 153, multiple hypothesis testers 154, multiple constraint solvers 155, multiple servers 160, multiple databases 155, or any number of any of the other components inside or outside the system 100. Similarly, the system 100 may include any number of internal data sources 201, external data sources 202, static model discovery modules 200, model change management modules 204, dynamic model discovery modules 206, agglomerated models 208, evaluators 220, data transformers 232, controllers 224, learning engines 226, user interfaces 228, applications under evaluation 230, any other component, program, or device of the system 100, or a combination thereof. In certain embodiments, substantial portions of the functionality and operations of the system 100 may be performed by other networks and systems that may be connected to system 100. In certain embodiments, the architecture of the system 100 may relate key functional elements, while remaining agnostic as to the technical processes employed within each functional element of the system. For example, deep neural networks, natural language processing, Bayesian analysis, and a variety of other techniques may be employed within any of the primary functional elements (static model discovery module 200, model change management module 204, dynamic model discovery module 206, evaluators 220, and data transformers 232) as well as within the cross-functional elements of the system 100 (controller 224, learning engine 226, and user interface 228). In certain embodiments, the system 100 may operate in conjunction with a single application under evaluation 230 or across multiple applications under evaluation 230. In certain embodiments, the system 100 may operate in a multi-threaded environment with multiple instances of each module, program, and/or component of the system 100 operating in parallel. Such parallel operations may be limited, in certain embodiments, by predetermined limits or ratios, performance metrics and statistics, hardware availability, user interfaces, external interfaces, and access limitations associated with the application under evaluation 230.

Figure 6:
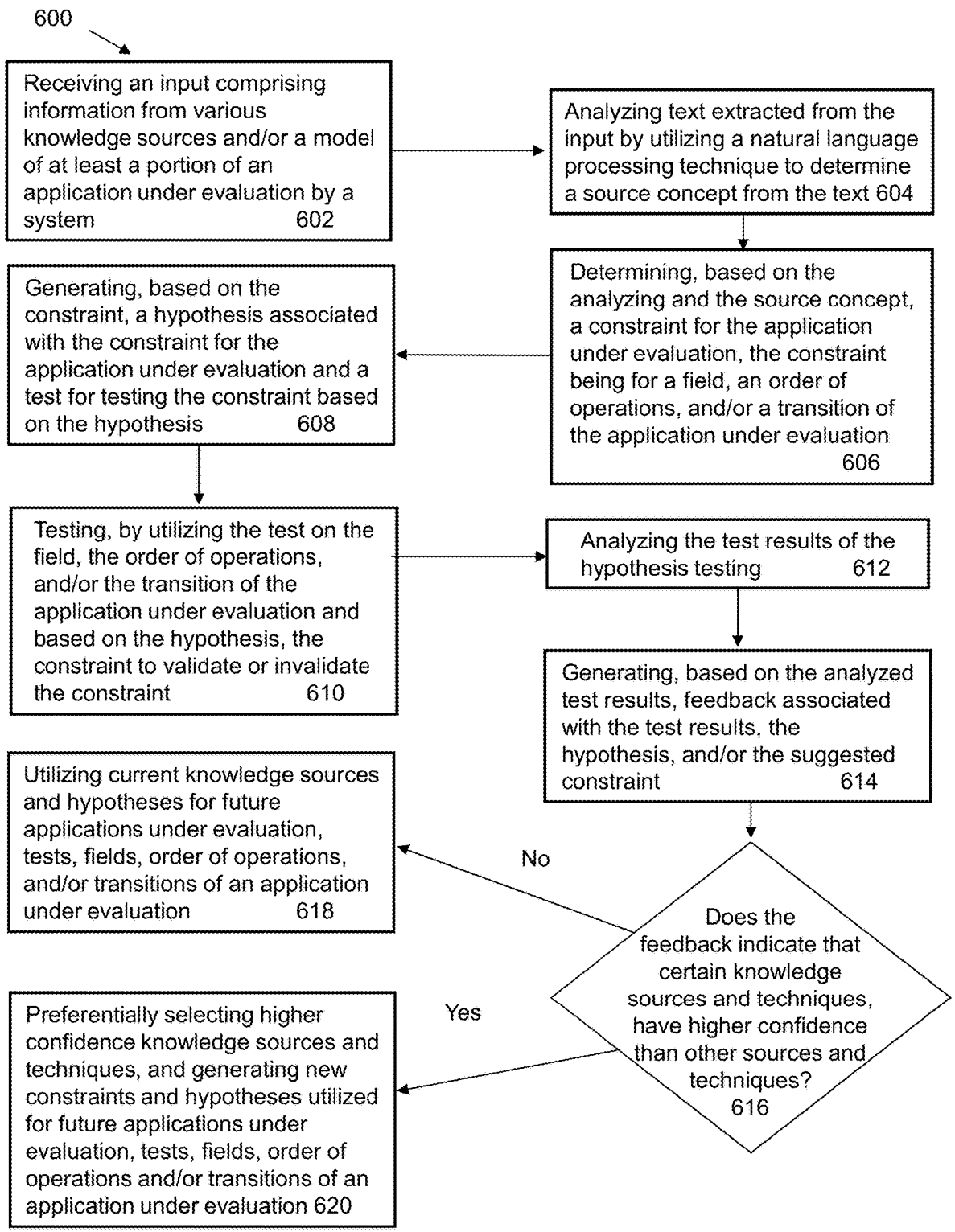
FIG. 6 is a flow diagram illustrating a sample method for understanding navigational semantics via hypothesis generation and contextual analysis according to an embodiment of the present disclosure.

As shown in FIG. 6, an exemplary method 600 for understanding navigational semantics via hypothesis generation and contextual analysis is schematically illustrated. In particular, the method 600 provides for state and constraint exploration based upon continuous generation, execution, and analysis of semantic hypotheses (e.g. website semantic hypotheses) based on likely semantic suggestions from knowledge sources (e.g. knowledge engine 153, natural language processing techniques, internal and/or external sources 201, 202, agglomerate models 208, database 155, any other source, or any combination thereof). In certain embodiments, an agglomerate model 208 or models may correspond with realized representations of the application under evaluation 230, unrealized representations of the application under evaluation 230 (e.g. a future specified capability of the application under evaluation which has not been fully implemented yet, a representation of the expected operations of the application under evaluation 230 where the actual operations may include differences, errors or inconsistencies, or other representation not fully consistent with the operations of the application under evaluation), or any combination thereof, in whole or in part. For the purposes of method 600, a user, such as first user 101, or a device, such as first user device 102, may be interested in having text or other information parsed and processed by the system 100, and may be interested in having the system 100 discover constraints for fields of an application under evaluation 230, constraints for navigating through various states of the application under evaluation 230, and/or constraints associated with the required order of operations to be performed for various functionality of the application under evaluation 230. Additionally, the user may be interested in having the system 100 conduct hypothesis testing on the constraints to determine whether the constraints are accurate and/or need to be modified, whether new hypotheses and/or modified hypotheses need to be generated, or a combination thereof.

Figure 3:
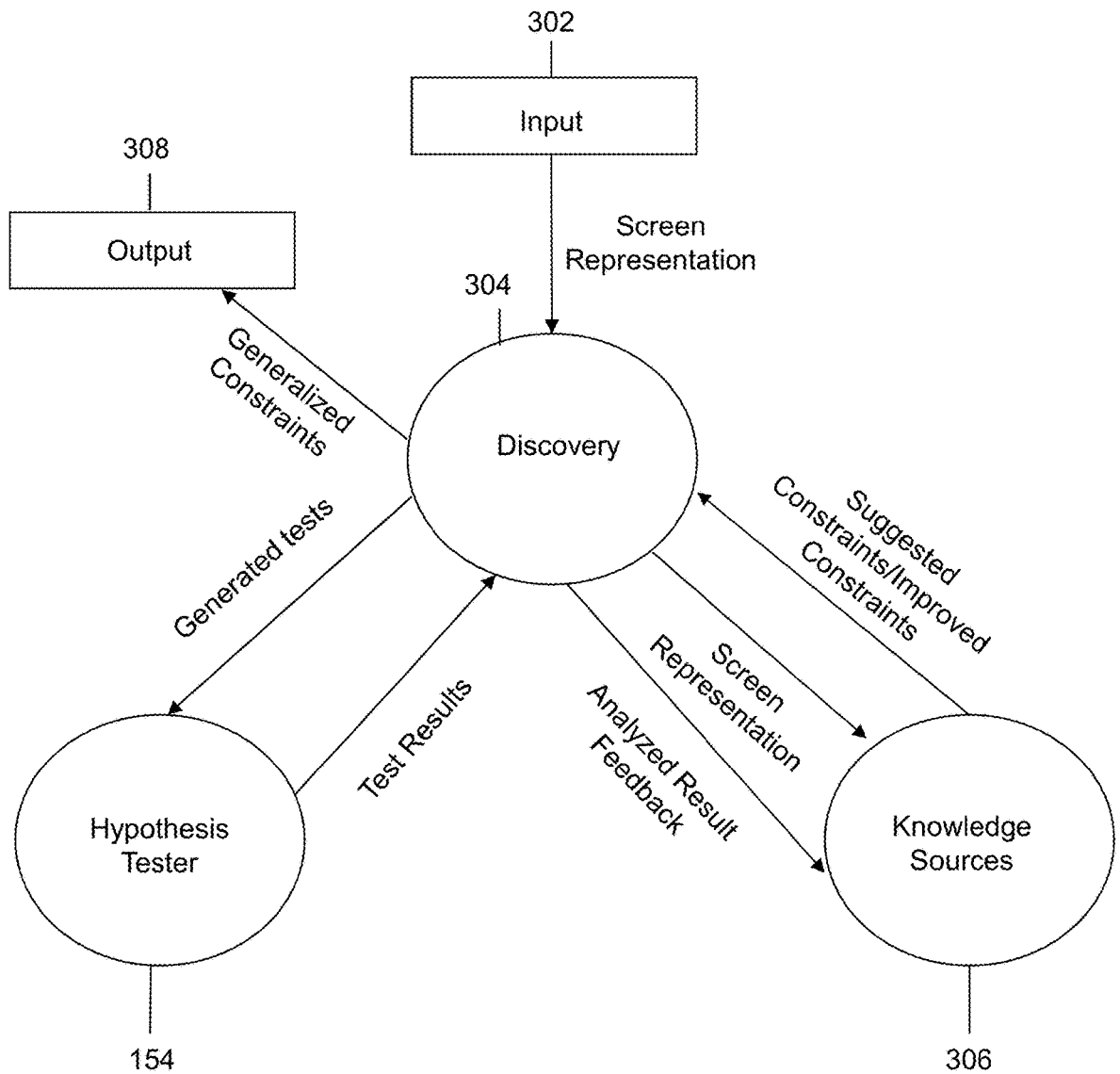
FIG. 3 is a schematic diagram for state and constraint exploration based upon continuous generated, execution, and analysis of semantic hypotheses based on likely semantic suggestions from integrated knowledge sources for use with the system of FIG. 1.

To that end and referring also to both FIGS. 3 and 6, at step 602, the method 600 receiving an input (e.g. input 302) comprising an output of an application under evaluation 230 (or other application) and/or comprising information from various knowledge sources 306 (e.g. document and/or other information sources of knowledge engine 153, the internal and/or external sources 201, 202, database 155, and/or any other source of knowledge, such as the knowledge engine 153, etc.) to facilitate with discovery 304 of constraints and/or information for the application under evaluation 230. For example, the input may be text that may be extracted from a user interface screen or other output displayed by the application under evaluation 230. A subset (all or some of the text) of the text of the input (i.e. source text to be utilized by the system to facilitate with the discovery of constraints, etc.) may include, but is not limited to including, field labels, help text, menu text, error message text, sentences, paragraphs, words, any text, text derived from audio or other communications media, or a combination thereof. Such source text may include field attributes, metadata (X-Y coordinates of labels, information, etc. associated with a field on a web page, for example; font, colors, page/chapter of documents, number of occurrences of the source text), changes from previous states of the application under evaluation 230 (e.g. source text was previously black text and now the source text is red). In certain embodiments, a field may comprise, but is not limited to, an input field (i.e. an input field of an application under evaluation 230 that can take any input), an output field (i.e. an output field of an application under evaluation 230 that can have any output), parameters (e.g. parameters of application programming interfaces (APIs)(e.g. REST APIs, HTTP/HTTPS calls, or other APIs)), an allowable value in an input and/or output media device (e.g. audio, video, image, text, virtual reality content, augmented reality content, any media of the first and/or second user device 102, 111), any type of field, or a combination thereof. In certain embodiments, the input may include existing constraints accessed by the system 100, previously existing constraints determined by the system 100, existing constraints determined by other systems, portions of constraints (e.g. a selected portion of a constraint), or a combination thereof. In certain embodiments, the input may be a structured and/or graphical model, such as a model of one or more functions and features of the application under evaluation 230 and/or some or all of the application under evaluation 230 itself. For example, given a website screen with two groups of fields, "Price Range" and "Year Range," each containing minimum and maximum subfields, the input model may be a tree where "Price Range" and "Year Range" are siblings in the tree structure, and each of them having children for their subfields. In certain embodiments, each of the nodes of the tree structure may be annotated with contextual information (e.g. labels for the fields and/or associated with the fields and/or subfields). In certain embodiments, the input may be received by utilizing the natural language processing engine 143, the part-of-speech tagger 144, the knowledge engine 153, the static model discovery module 200, the controller 224, the first user device 102, the second user device 111, the server 140, the server 150, the server 160, the communications network 135, any combination thereof, or by utilizing any other appropriate program, network, system, or device.

At step 604, the method 600 may include analyzing and/or parsing text extracted from the input, such as by utilizing one or more natural language processing techniques. For example, the text to be parsed may be extracted from the hierarchical and/or graphical model, the agglomerated models 208, document manuals, requirements documents for the application under evaluation 230 or other applications, user stories, tutorials, software and/or hardware documentation, any information source, or any combination thereof. In certain embodiments, the text may be extracted from documents and/or files obtained from the internal data sources 201, the external data sources 202, the application under evaluation 230, the database 155, any component in system 100, and any components illustrated in FIGS. 1 and 2, or any combination thereof. The natural language processing techniques may be utilized to extract an intent from the text, a sentiment from the text, relationships between words in the text, a meaning of the text, likely constraint information from the text, navigational information from the text, order of operations information from the text, source concepts from the text (e.g. single or multiword concepts, which may be a noun, pronoun, subject, or object of a sentence, or any other classification), any other information, or a combination thereof. In certain embodiments, multiword concepts may be sets of words and may include one or more nouns, pronouns, subjects, and objects, and may include descriptive words, such as, but not limited to, articles, adjectives, conjunctions, qualifiers, adverbs, any parts of speech, any other classification, or a combination thereof. In certain embodiments, the multiword concepts may be built from tokenization, nounizations, verbizations, adverbizations, adjectivizations, or any combination thereof (e.g. as described title "System for Providing Intelligent Part of Speech Processing of Complex Natural Language", which is incorporated by reference in the present disclosure in its entirety). When extracting the information from the text, the system 100 may integrate and/or connect with the knowledge engine 153, which may include the natural language processing engine 143 and/or part-of-speech tagger 144 in certain embodiments. In certain embodiments, the parsing and/or analyzing may be performed and/or facilitated by utilizing the natural language processing engine 143, the part-of-speech tagger 144, the knowledge engine 153, the static model discovery module 200, the controller 224, the first user device 102, the second user device 111, the server 140, the server 150, the server 160, the communications network 135, any combination thereof, or by utilizing any other appropriate program, network, system, or device.

At step 606, the method 600 may include determining, based on the analyzing, a constraint (or any number of constraints) for one or more constraint targets (i.e. a target which the system intends to relate to the constraint), such as, but not limited to, fields of the application under evaluation 230 (e.g. input fields), an order of operations that may be performed within the application under evaluation 230, and/or one or more transitions of the application under evaluation 230. In certain embodiments, the constraint may be stored in a configuration, which may represent a web page or portions thereof, and the constraint may be constructed in terms of the identifier of the constraint target related to the constraint. In certain embodiments, the constraints may include, but are not limited to, the likely type of values to be utilized with fields and/or parameters of the application under evaluation 230 (e.g. the fields under the "Price Range" label are dollar-denominated fields), appropriate default values for fields and/or parameters, an indication of whether a field is required or optional, appropriate formatting settings for values to be inputted into the fields and/or parameters, an indication of which fields are to be completed and in what order, a range of values that constrain potential input values for fields and/or parameters (e.g. the minimum should be less than the maximum for each field and/or subfield of each field), an indication of operations to be conducted and/or values to be inputted to successfully transition from one state of the application under evaluation 230 to another state, any other constraint, or any combination thereof. In certain embodiments, the determining of the constraint may be performed by determining potential correlations between the parsed text and one or more fields of the application under evaluation 230 (e.g. input fields), an order of operations that may be performed within the application under evaluation 230, and/or one or more transitions of the application under evaluation 230. For example, based on the parsing and/or processing conducted at step 604, the system 100 may determine that the parsed text corresponding to a label (e.g. a price label or other label) should be correlated to a field of the application under evaluation 230 that can receive an input value corresponding to the label. As another example, based on the analyzing, parsing and/or processing conducted at step 604, the analyzed text may indicate an association with and information relating to the order of operations to be conducted for a specific function(s) of the application under evaluation 230. As a further example, based on the parsing and/or processing conducted at step 604, the analyzed text may indicate information pertaining to how to transition from one state of the application under evaluation 230 to another state or next state of the application under evaluation 230. In certain embodiments, the determining of the potential correlations may include scoring a relationship between two items (e.g.

a label and an alert message outputted by the application under evaluation 230, or a label and a constraint) to determine how closely the items are related. In certain embodiments, the score may be between 0.0 and 1.0, however, other ranges are contemplated according to the present disclosure. In certain embodiments, the relationship between the items being correlated may be defined by the similarity of different attributes including, but not limited to, proximity, semantic meaning, domain meaning, application function, format, hierarchy (siblings, parent-child, etc. in a tree), constraints, natural language processing attributes, similarity scores, fuzzy matches, regular expression matching, and/or any other criteria. In the certain embodiments, the determining of the constraints may be performed and/or facilitated by utilizing the natural language processing engine 143, the part-of-speech tagger 144, the knowledge engine 153, the constraint solver 156, the static model discovery module 200, the controller 224, the first user device 102, the second user device 111, the server 140, the server 150, the server 160, the communications network 135, any combination thereof, or by utilizing any other appropriate program, network, system, or device.

In certain embodiments, the method 600 may also include, at step 606, generating and/or determining a confidence value for the constraint (e.g. initial confidence value), which may be based on a variety of factors. For example, in certain embodiments, the confidence value may be based on the strength of the correlation or association between the process information and the field, order of operations, and/or transitions of the software application, the quality of the natural language processing of the textual and contextual information, the number of reinforcing and/or conflicting sources of constraint information, the source of the constraint, the complexity of the constraint, any other factor, or a combination thereof. The confidence value may correspond to a level of confidence that the system 100 has built and/or constructed the constraint correctly. In certain embodiments, the confidence value may include uncertainty from the natural language processing of the parsed text, uncertainty from pulling source concepts and information from the text, uncertainty from building the constraint from the concepts and the text, uncertainty of mapping the constraint to the correct labels, widgets and/or other information on a web page, any other uncertainty, or any combination thereof. In certain embodiments, the difference between the initial confidence value and the correlating performed in step 606 is that correlating may be the task of mapping at least one object to at least one other object, where an object may be, for example: a label, a field, an alert message, an error, a window, a menu, a radio button, a button, a tab, a widget, a word, a phrase, a sentence, a paragraph, a concept, a constraint, and/or any other item. Whereas, the initial confidence may be an aggregate of confidences all along the path from exploring the raw text (e.g. English text) to building the constraint to mapping the constraint to label(s), as well as other steps disclosed herein. In certain embodiments, the confidence value may be determined by utilizing the natural language processing engine 143, the part-of-speech tagger 144, the knowledge engine 153, the constraint solver 156, the static model discovery module 200, the controller 224, the first user device 102, the second user device 111, the server 140, the server 150, the server 160, the communications network 135, any combination thereof, or by utilizing any other appropriate program, network, system, or device. In certain embodiments, the correlating between the parsed text and the field, order of operations, and/or transitions of the application under evaluation 230 may be based on a softmatch. The functionality for a softmatch may be performed by utilizing the natural language processing engine 143, the hypothesis tester 154, the knowledge engine 153, any other suitable component of the system 100, or a combination thereof. A softmatch may be a match with some degree of uncertainty between a field (or order of operations and/or transition) and a constraint. The softmatch may be computed from the potential correlation similarity methods. In certain embodiments, a softmatch may be a match having a confidence value less than 1.0 (where normalized certainty or confidence value ranges between 0.0 and 1.0). A softmatch may be in contrast to a hard match, especially with manually configured systems, where a hard match between field and constraint is hardcoded and certain (i.e. 1.0 or at least implicitly 1.0). Besides confidence, in some embodiments, a softmatch may be composed by having at least two similarity confidences computed (for example, a proximity check as well as a natural language processing similarity score). In certain embodiments, the scores may be combined in different embodiments such as an average, a weighted average, or a max/min score may be chosen, or a score picked from the most trusted source (e.g. natural language processing similarity score), or any other criteria. In certain embodiments, softmatches with too low of a confidence score (e.g. below a threshold) may be unused or discarded by a filtering step conducted by the system 100.

At step 608, the method 600 may include generating, based on the constraint, a hypothesis associated with the constraint for the application under evaluation, and/or generating one or more tests for testing the hypothesis. In certain embodiments, the system 100 may generate the hypotheses from the constraints, and the accompanying hypothesis test cases by leveraging a constraint resolution engine, such as hypothesis tester/constraint resolution engine 154. Referring to the above example, a first pass by the system 100 may generate several hypotheses: the likely types of the fields (dollar, year), and/or the likely constraints between the fields (minimum<=maximum). In certain embodiments, a combination of a rules engine with a built-in constraint solver (e.g. constraint solver 156) may be used to generate a set of test cases to validate the generated hypotheses. For each constraint suggestion, a constraint solver 156, (in certain embodiments the constraint solver 156 may be Microsoft Research's Z3 SMT constraint solver or another suitable constraint solver) may be utilized to create a set of solutions for both the constraint, and the negation of the constraint. As an example, considering the "Price Range" fields discussed above, an initial set of generated hypothesis tests may include tests such as (minimum==maximum, minimum<maximum, minimum>maximum), which collectively may be used to validate the initial hypotheses. Other hypothesis tests may include verifying suggested data types and formats. Similarly, the system may further verify that non-dollar inputs ("arbitrary strings", 4.52E10, £5.23, 555-55-5555) fail for the "Price Range" fields. In certain embodiments, as part of generating hypothesis tests, some tests may be generated that can be considered equivalent. For such tests, the system 100 may optionally run a hypothesis test optimizer to simplify or reduce the number of hypothesis tests, which run via use of input partitioning techniques and equivalence classing of necessary test inputs. Additionally, in some cases the system 100 may order the hypothesis test cases to improve locality of reference, which thereby improves runtime performance. In certain embodiments, the system may generate a pool of possible hypothesis test cases and leverage sampling or rotation techniques to both reduce the number of test cases executed during any given session, while allowing for other cases to be covered in subsequent sessions. Additionally, the system 100 may observe and learn (e.g. by using learning engine 226) if a group of hypothesis test cases yielded a higher reward (information gain, or performance gain), and may choose to add more test cases from the pool for a particular focused area of the application under evaluation 230. In certain embodiments, the generating of the hypotheses and/or the tests for testing the hypotheses may be performed and/or facilitated by utilizing the natural language processing engine 143, the part-of-speech tagger 144, the knowledge engine 153, the hypothesis tester 154, the constraint solver 156, the static model discovery module 200, the controller 224, the first user device 102, the second user device 111, the server 140, the server 150, the server 160, the communications network 135, any combination thereof, or by utilizing any other appropriate program, network, system, or device.

At step 610, the method 600 may include conducting hypothesis and/or other testing on the constraint by utilizing one or more tests. In certain embodiments, hypothesis testing may comprise testing a constraint by determining how the application under evaluation 230 reacts when using the constraint with the application under evaluation 230, along with determining the outputs generated by the application under evaluation 230 when input values are utilized with fields, parameters, operations, and/or transitions of the application under evaluation 230 in accordance with the constraint. In certain embodiments, hypothesis testing may be performed to increase the initial confidence value for the constraint. For example, if input values for a constraint fail when inputted into the application under evaluation 230, the initial confidence value may be reduced or the constraint may be discarded. Similarly, if the input values for the constraint are accepted, the initial confidence value may be increased accordingly. In certain embodiments, the resulting increased confidence value may be utilized by the system 100 to keep or discard the constraint, or prioritize the constraint over other constraints, such as constraints that already exist or other constraints that have been suggested by the system 100. As part of running the hypothesis tests, the system 100 may encounter more information, such as an alert and/or error pertaining to the fields in question. A new screen representation can then be constructed by the system 100 and sent to the knowledge engine 153, which may lead to the generation of a new constraint, such as one that imposes a lower bound and upper bound on the Price Range (ex: must be between $0.00 and $100.00). The system 100 may further generate hypothesis tests that validate that the values inside the new constraint are accepted (e.g. $0.00, $12.34, $100.00). The system 100 may further verify that values outside of the constraint are not allowed (e.g. −$1.00, $100.01). The discovery 304 conducted by the system 100 continuously executes this process until no new constraints are found. In certain embodiments, the hypothesis and/or other testing may be performed and/or facilitated by utilizing the natural language processing engine 143, the part-of-speech tagger 144, the knowledge engine 153, the hypothesis tester 154, the constraint solver 156, the static model discovery module 200, the controller 224, the first user device 102, the second user device 111, the server 140, the server 150, the server 160, the communications network 135, any combination thereof, or by utilizing any other appropriate program, network, system, or device.

Also, at step 610, the method 600 may include determining if the constraint is valid. In certain embodiments, as the constraints generated by the system 100 are tested, the results may also be fed to the executors/evaluators 220 of the system 100. For example, the results may be fed to the validators 222, which may be configured to evaluate the hypotheses generated by the system 100 and/or validate the tested constraints. In certain embodiments, the validation may be conducted by verifying that values inputted into the application under evaluation 230 that are outside of the constraint are not allowed by the application under evaluation 230, and conversely, that values inside the constraint are allowed by the application under evaluation 230. In certain embodiments, validation may be conducted by verifying the constraints relating to formatting of input values for fields. For example, if the system 100 attempts to input a value in a field of the application under evaluation 230 that has a precision outside the formatting of the constraint and the application under evaluation 230 returns an error, the constraint may be validated. In certain embodiments, the validating may be performed and/or facilitate by utilizing the evaluators 223, the natural language processing engine 143, the part-of-speech tagger 144, the knowledge engine 153, the hypothesis tester 154, the constraint solver 156, the static model discovery module 200, the controller 224, the first user device 102, the second user device 111, the server 140, the server 150, the server 160, the communications network 135, any combination thereof, or by utilizing any other appropriate program, network, system, or device. If the constraint is determined to be valid, the method 600 may include validating the constraint and utilizing the constraint with the application under evaluation 230, such as for testing purposes or for other purposes. If the constraint is determined to not be valid, the method 600 may proceed back to step 608 and may continue to generate further constraints.

At step 612, the method 600 may include analyzing the tests results of the hypothesis testing conducted by the system 100. For example, the test results may include information indicating that a constraint is confirmed to be accurate, confirmed to be inaccurate, has been rejected, has been accepted, and/or any other information associated with the testing of the constraint may be included in the test results. In certain embodiments, the analyzing may be performed and/or facilitated by utilizing the natural language processing engine 143, the part-of-speech tagger 144, the knowledge engine 153, the hypothesis tester 154, the constraint solver 156, the static model discovery module 200, the controller 224, the first user device 102, the second user device 111, the server 140, the server 150, the server 160, the communications network 135, any combination thereof, or by utilizing any other appropriate program, network, system, or device. At step 614, the method 600 may include generating, based on the analyzed test results, feedback associated with the test results, the hypotheses, and/or the constraint. In certain embodiments, the system 100 may include a feedback loop mechanism, which may include providing confidence level feedback to the knowledge source engines (e.g. knowledge engine 153) based in part on the success and/or failure rates resulting from the hypothesis testing of the hypotheses associated with the constraints, thereby improving the confidence and accuracy of newly generated hypotheses during the continuous discovery 302 process. Another example of feedback may include execution time, allowing the knowledge sources (e.g. as included in knowledge engine 153) to prefer more efficient suggestions over slower, otherwise equivalent in result, counterparts. In certain embodiments, knowledge source feedback mechanisms may include learning, such as by utilizing learning engine 226, which techniques produce the best suggestions, and thereby giving such techniques more confidence in future constraint and/or hypotheses suggestions.

Learning may further include predicting which data (e.g. English sentences/features (subject→verb→object)) produces which constraint and/or hypotheses suggestions. Thus, an incoming sentence, which is similar to a historical one, may have the same or similar outputted constraint and/or hypothesis suggestion with a higher confidence. Learning may further include machine-learning aspects in order to classify the best techniques and/or data to utilize for new screen representations (e.g. for use in a model that may be used as input in step 602, for example) based on feedback from prior constraint and/or hypothesis suggestions. Thus, the system 100 may learn that knowledge source techniques with high positive feedback are to be preferred over methods with negative feedback allowing for the system 100 to get more intelligent over time. In certain embodiments, the feedback may be generated and/or provided by the system in the form of reports (e.g. reports 242). For example, a human user and/or software agent (e.g. components of the system 100) may generate and/or explore the reports. In certain embodiments, the human user and/or software agent may provide information to adjust confidences values associated with the constraint, any information associated with the constraint, any other confidence disclosed in the present disclosure, or a combination thereof.

Also, at step 614, the method 600 may include providing additional information relating to the testing of the constraint to the learning engine 226 for further processing. For example, information indicating that a constraint is confirmed to be accurate, confirmed to be inaccurate, has been rejected, has been accepted, and/or any other information associated with the testing of the constraint may be provided to the learning engine 226. In certain embodiments, the providing of the information to the learning engine 226 and/or the functionality of the learning engine itself may be performed and/or facilitated by utilizing the natural language processing engine 143, the part-of-speech tagger 144, the knowledge engine 153, the hypothesis tester 154, the constraint solver 156, the static model discovery module 200, the controller 224, the first user device 102, the second user device 111, the server 140, the server 150, the server 160, the communications network 135, any combination thereof, or by utilizing any other appropriate program, network, system, or device. In certain embodiments, the learning engine 226 may assist in refining (e.g. adjusting and/or making more precise) confidence values for the constraints over time as new information is obtained from information sources, as new information is obtained from the results of natural language processing of textual information received from the information sources, and/or new information is received from the application under evaluation 230 itself. In certain embodiments, the constraints and/or related confidence values may be utilized to represent the application under evaluation 230. In such embodiments, the constraint information may be utilized to successfully navigate or exercise the application under evaluation 230. In another embodiment, the system 100 may include utilizing the constraints and/or related confidences to represent the desired or even intended functionality of the application under evaluation 230. In such an embodiment, the system 100 may utilize the constraint information to support the autonomous testing of the application under evaluation. The learning engine 226 may process all of the information received from the hypothesis testing and/or other testing and may utilize such information for future applications under evaluation 230, such as when generating constraints. For example, if a constraint was rejected at step 610 based on the hypothesis testing, the learning engine 226 may cause the system 100 to not even suggest the constraint for the same application under evaluation 230, a different application under evaluation 230, and/or any type of application, when discovering field, navigation, and/or order of operation constraints on a subsequent occasion.

At step 616, the method 600 may include determining if the feedback analyzed by the learning engine 226 and/or other components of the system 100 indicate that certain knowledge sources and/or techniques have higher confidence than other sources and techniques. For example, certain natural language processing techniques may be learned by the system 100 (e.g. via learning engine 226) to be the most accurate, and, separately, a certain source may be learned to be the most accurate by the system 100. If not, the method 600 may proceed to step 618, which may include utilizing current knowledge sources and/or hypotheses for future applications to be tested, for a future test of the application under evaluation 239, for generating constraints for future applications and/or future tests of the current application under evaluation 230, or a combination thereof. If, on the other hand, the feedback analyzed indicates that certain knowledge sources and techniques having higher confidence than other sources and/or techniques, the method 600 may proceed to step 620. At step 620, the method may include preferentially selecting the higher confidence knowledge sources and/or techniques when generating new constraints and/or hypotheses for future applications to be tested, for a future test of the application under evaluation 239, for generating constraints for future applications and/or future tests of the current application under evaluation 230, or a combination thereof, thereby optimizing the generation of constraints and/or hypotheses as the system 100 gets more intelligence. Notably, the method 600 may further incorporate any of the features and functionality described for the system 100 or as otherwise described herein.

The method 600 and system 100 may also include other functionality and features. For example, the method 600 and system 100 may include determining if the constraint (or multiple constraints) can be merged and/or combined with one or more other constraints to form generalized/merged constraints as an output 308 of the system 100. In certain embodiments, the determining may be performed and/or facilitated by utilizing the natural language processing engine 143, the part-of-speech tagger 144, the knowledge engine 153, the hypothesis tester 154, the constraint solver 156, the static model discovery module 200, the controller 224, the first user device 102, the second user device 111, the server 140, the server 150, the server 160, the communications network 135, any combination thereof, or by utilizing any other appropriate program, network, system, or device. If the constraint can be merged with one or more other constraints, the method 600 may include merging the constraint with the one or more other constraints to generate a generalized, complex, and/or relational constraint. For example, if the feedback, hypothesis testing, and/or analyzing indicates that certain constraints have values dependent on one another, have related features, are compatible, have at least a portion of overlapping constraint information, or have any connection to one another, the system 100 may merge such constraints to create a generalized, complex, and/or relational constraint. For example, if the system 100 determines that a constraint for one field must contain a value that is less than the value to be inputted into a second field, the system 100 may merge these constraints based on their relation and/or dependence on one another. In certain embodiments, the merging and/or combining may be performed and/or facilitated by utilizing the natural language processing engine 143, the part-of-speech tagger 144, the knowledge engine 153, the hypothesis tester 154, the constraint solver 156, the static model discovery module 200, the controller 224, the first user device 102, the second user device 111, the server 140, the server 150, the server 160, the communications network 135, any combination thereof, or by utilizing any other appropriate program, network, system, or device. If the constraint cannot be merged with one or more other constraints and/or if the system 100 determines that the constraint should not be merged with one or more other constraints, the method 600 may simply proceed accordingly.

In certain embodiments, a generalized constraint may be a constraint that is built from one or more constraints and/or or one or more hypotheses to satisfy a field's requirements. Forming a generalized constraint may involve detecting at least one pattern from the constraints, or hypotheses, and building the generalized constraint to satisfy the pattern and known hypotheses regarding the field. As an example, the system 100 may note that a hypothesis including integers 1 and 2 are allowed into some field Z. Thus, the system 100 may build a first constraint Z==1, and a second constraint may be Z==2, and the system 100 may combine these two constraints into a constraint ((Z==1)||(Z==2)) from the simple pattern of determining that 1 and 2 succeed. Over time, the system 100 may determine that hypotheses including integers between 1, 2, 5, 9, 12 are allowed into Z, but −1, 0, 13, 15, 100 are not allowed. The system 100 may have a second constraint thus far of: ((Z==1)||(Z==2)||(Z-5)||(Z-9)||(Z==12)) from the simple pattern of seeing the values allowed and not allowed. From this pattern of information, the system 100 may speculate and/or determine that a generalized constraint should be: (Z between 1 and 12) by further analyzing the pattern of values allowed and not allowed. The system 100 may create this generalized constraint, and then the system 100 may perform hypothesis testing to validate this suggestion.

As another more complex example, suppose document A indicates field X>0, and suppose document B indicates field X<10. The system 100 begins by testing each constraint individually, and the system 100 may observe that both are at least partially true (both 2 successes out of 3 attempts). The pattern may be that values around the boundaries work as expected, but further away values may not. They system may then combine them (ANDS them), and the system may find that all hypotheses hold giving it a higher confidence and success rate (4 successes out of 4 attempts) than the simpler constraints. The table below illustrates this further:

| Step | Constraint | Hypothesis | Expected Result | Actual Result | Working Confidence |
|---|---|---|---|---|---|
| 1 (1st constraint) | X > 0 | 0 | Fail | Fail | .75 |
| 2 (1st constraint) | X > 0 | 1 | Pass | Pass | .80 |
| 3 (1st constraint) | X > 0 | 10 | Pass | Fail | .75 |
| 4 (2nd constraint) | X < 10 | 0 | Pass | Fail | .65 |
| 5 (2nd constraint) | X < 10 | 9 | Pass | Pass | .70 |
| 6 (2nd constraint) | X < 10 | 10 | Fail | Fail | .75 |
| 7 (gen constraint) | X > 0 && X < 10 | 0 | Fail | Fail | .75 |
| 8 (gen constraint) | X > 0 && X < 10 | 1 | Pass | Pass | .80 |
| 9 (gen constraint) | X > 0 && X < 10 | 9 | Pass | Pass | .85 |
| 10 (gen constraint) | X > 0 && X < 10 | 10 | Fail | Fail | .90 |

In certain embodiments, the determining of a constraint or constraints, and/or the adjusting of a constraint or constraints, may involve one or more operations on a constraint or constraints, associated confidences, associated metadata, or a combination thereof, where an operation may be the determining of a new constraint or constraints, the simplifying of one or more constraints, the combining of two or more constraints, the generalizing of one or more constraints, or a combination thereof. For example, given a first constraint, 0<A<100, and a second constraint, 10<A<20, the combining of the first constraint with the second constraint may result in a first combined constraint, where an OR operation is used to connect the first constraint and the second constraint, ((0<A<100)||(10<A<20)), and a second combined constraint, where an AND operation is used to connect the first constraint and the second constraint, ((0<A<100) && (10<A<20)). As a further example, simplifying may be applied to the first combined constraint resulting in a first simplified constraint, (0<A<100), and/or simplifying may be applied to the second combined constraint resulting in a second simplified constraint, (10<A<20). As further steps, hypothesis generation, hypothesis testing, and feedback generation may be performed such that the confidence of the second simplified constraint is raised relative to the first simplified constraint, such that the second simplified constraint becomes the first validated constraint, (10<A<20). In a further example, similar combining and simplifying may be performed on additional determined or adjusted constraints such that a multiplicity of constraints on 'A' exist, where the constraints form a pattern, (e.g. (10<A<20), (30<A<40), (50<A<60), (70<A<80), (90<A<100), (110<A<120), (150<A<160), (210<A<220), 1310<A<1320), which in some embodiments may be represented by a complex constraint(10<A<20)|| (30<A<40)|| (50<A<60)|| (70<A<80)||(90<A<100)|| (110<A<110)|| (150<A<160)||(210<A<220)||1310<A<1320). In certain embodiments, the determining and/or adjusting of a constraint may include generalizing a multiplicity of constraints or a complex constraint, where the generalizing may be based on the multiplicity of constraints, the complex constraint, feedback associated with hypothesis testing, associated confidences, input data, output data, other information, or a combination thereof, and where the generalizing involves detecting at least one pattern present in a multiplicity of constraints and/or a complex constraint, and building the generalized constraint to satisfy the pattern and known hypotheses regarding said field. For example, a certain embodiment may recognize the pattern in the complex constraint and generate a multiplicity of associated constraints, including a generalized constraint, (N<A<(N+ 10)), and an associated constraint, (((N %10)==0) && (((N/10)%2)==1)), wherein the % operator is the modulus operator. Such seemingly complex patterns may be detected utilizing algorithms associated with the domain of the application under evaluation (e.g. frequency analysis for detecting patterns in signal processing or physics domains, using machine learning techniques (e.g. image analysis solutions such as those capable of detecting objects in images), or other technique suitable to the analysis of constraint patters within the application under evaluation 230. In certain embodiments, the history of hypothesis testing feedback associated with either the multiplicity of constraints and/or the complex constraint may be utilized in the generalizing. In certain embodiments, hypotheses to test the generalized and/or associated constraints may be generated, hypothesis tests performed, and hypothesis testing feedback utilized in the further determining or adjusting of the generalized constraint. Certain complex constraints, like the generalized and associated constraints above, can come from various machine learning analysis, domain analysis, or mathematical analysis conducted by the system 100. For example, Fourier analysis or frequency analysis may be able to help derive some such formula. In certain embodiments, merging is another technique that the system 100 may utilized to combine two constraints together. An example may be where one constraint is a superset or subset of the other constraint, and therefore can be subsumed into the other. For example, given A<5 along with A<10, if the system 100 is going to merge with an OR, as in (A<5||A<10), the system 100 may simply be left with A<10 since it is a superset of the A<5. Whereas, if the system 100 merges using a more restrictive AND, as in (A<5 && A<10), the system 100 may be left with A<5 since it is the subset left after the AND.

In certain embodiments and as indicated above, several constraints may be suggested, tested, and/or analyzed during the discovery 302 process. In certain embodiments, the system 100 may determine that it is possible that the combination of several constraints may be closer to the true semantic constraint on the application under evaluation 230 (e.g. website or software application), and, as such, should also be hypothesis tested and further analyzed. The system 100 may construct one or more complex constraints on multiple fields or functional transitions with associated confidences based on the testing results of the hypothesis testing. As an example and referring now also to FIGS. 4 and 5, the combination of several constraint fragments may lead to the creation of the following generalized constraint, which covers both the minimum<maximum requirement, as well as the lower/upper bound requirement, as well as possibly a requirement capturing the ability to leave the fields blank altogether. In certain embodiments, an additional point of complexity may be that the "Price Range" fields may be entirely optional (i.e. may or may not enter a value for these fields), which may yield four possible combinations: (both Minimum Price and Maximum Price filled in, the Minimum Price filled in and the Maximum Price not filled in, the Minimum Price not filled in and the Maximum Price filled in, and/or none filled in). The system 100 may handle this use-case scenario by using a truth table and a constraint fragment collection algorithm to combine the constraints. For the "Price Range" fields, for example, the constraint fragment output 402 is schematically illustrated in FIG. 4. In constraint fragment output 402, each of the four possible combinations described above for the "Price Range" fields are logically ORed together (i.e. using the || operator) to create the combined constraint fragment output 402. In particular, from FIG. 4, (Minimum Price !=null && Maximum Price !=null && Minimum Price<=Maximum Price && Minimum Price>=$0.00 && Maximum Price<=$100.00) corresponds to the possible combination of inputting values in both the Minimum and Maximum Price fields, having the Minimum Price being less than or equal to the Maximum Price, having the Minimum Price being greater than or equal to $0.00, and having the Maximum Price being less than or equal to $100.00. Additionally, from FIG. 4, (Minimum Price !=null && Maximum Price==null && Minimum Price>=$0.00 && Minimum Price<=$100.00) corresponds to the possible combination of inputting values for the Minimum Price field, not inputting values for the Maximum Price field, having the Minimum Price being greater than or equal to $0.00, and the Minimum Price being less than or equal to $100.00. Furthermore, from FIG. 4, (Minimum Price==null && Maximum Price !=null && Maximum Price>=$0.00 && Maximum Price<=$100.00) corresponds to the possible combination of having no input value for the Minimum Price field, having an input value for the Maximum Price field, having the Maximum Price being greater than or equal to $0.00, and having the Maximum Price being less than or equal to $100.00. Lastly, from FIG. 4, (Minimum Price==null && Maximum Price==null) corresponds to the combination where no input values are inputted into the Minimum Price field and the Maximum Price field. Because these constraints are related, the system 100 may logically OR each of the constraints together since they relate to and/or affect each other (i.e. Maximum Price and Minimum Price fields of the Price Range Field).

Since there may also be fields corresponding to a "Year Range", the constraint fragment output 404 in FIG. 4 may also be generated. The output 404 includes the logically ORed possible combinations for the "Year Range" fields. For example, the combinations may include both Minimum Year and Maximum Year filled in, the Minimum Year filled in and the Maximum Year not filled in, the Minimum Year not filled in and the Maximum Year filled in, and/or neither Minimum Year nor Maximum year filled in. In particular, from FIG. 4, (Minimum Year !=null && Maximum Year !=null && Minimum Year<=Maximum Year && Minimum Year>=1980 && Maximum Year<=2017) corresponds to the possible combination of inputting values in both the Minimum and Maximum Year fields, having the Minimum Year being less than or equal to the Maximum Year, having the Minimum Year being greater than or equal to 1980, and having the Maximum Year being less than or equal to 2017. Additionally, from FIG. 4, (Minimum Year !=null && Maximum Year==null && Minimum Year>=1980 && Minimum Year<=2017) corresponds to the possible combination of inputting values for the Minimum Year field, not inputting values for the Maximum Year field (i.e. Null value), having the Minimum Year being greater than or equal to 1980, and the Minimum Year being less than or equal to 2017. Furthermore, from FIG. 4, (Minimum Year==null && Maximum Year !=null && Maximum Year>=1980 && Maximum Year<=2017) corresponds to the possible combination of having no input value for the Minimum Year field, having an input value for the Maximum Year field, having the Maximum Year being greater than or equal to 1980, and having the Maximum Year being less than or equal to 2017. Lastly, from FIG. 4, (Minimum Year==null && Maximum Year==null) corresponds to the combination where no input values are inputted into the Minimum Year field and the Maximum Year field. As with the Price Range example above, these constraints may be related, and the system 100 may logically OR each of the constraints together since they relate to and/or affect each other (i.e. Maximum Year and Minimum Year fields corresponding to the year range).

Referring now also to FIG. 5, the system 100 may conduct another iteration and determine relationships between the Price Range fields and the Year Range fields. The determined relationships may indicate that the Price Range field constraints and Year Range constraints are related, have a threshold level of similarity to one another, depend on one another, take similar input values to one another, and/or have any other relation to one another. In this case, the system 100 may determine that the constraint fragments for Price Range and Year Range, while having different minimum and maximum values, have a threshold level of similarly for the combinations to be tested (e.g. both Minimum and Maximum Price and Year fields filled in, the Minimum Price and Minimum Year filled in and the Maximum Price and Maximum Year not filled in, the Minimum Price and Minimum Year not filled in and the Maximum Price and Maximum Year filled in, and/or none of the fields filled in). Based on the analysis and functionality provided by the system 100, the system 100 may determine that the combination of the constraint fragments 402, 404 may more accurately resemble the true semantic constraint on the application under evaluation 230 and may formalize the generalized total constraint 502 in FIG. 5 by logically ANDing (i.e. combining using the logical AND operator signified by "&&") the constraint fragments 402 and 404 together. The system 100 may then proceed to conduct hypothesis testing or other testing of the generalized total constraint 502 and analyze the results accordingly.

Optionally, in certain embodiments, one or more components of the system 100 may include a constraint optimizer that may run to simplify constraints or reduce the number of constraints as part of creating the generalized constraints (e.g. constraint 502). Once a set of improved generalized constraints are established, the system 100 may create two finite state machine transitions, one with the above constraint which starts from the website screen in question, and leads to a success state (indicating that valid inputs were provided by the user). A second finite state machine transition may include the negated version of the above constraint (not shown), which would lead to an error state (indicating invalid inputs were provided) with the application under evaluation 230. In certain scenarios and embodiments, a hypothesis may be proved correct or incorrect. When a hypothesis is incorrect, the system 100 may generate a new hypothesis and go through a further round of hypothesis testing. The new hypothesis may be modifications of the old hypothesis, or the new hypothesis may be completely independent of the old hypothesis. In either case and in certain embodiments, the new hypothesis tests may be based on the results of previous hypothesis tests. As an example, if a hypothesis was that only values 1-12 should be accepted for a month field, but, when entering a "1", an error is returned which says please enter month as two digits, then a next constraint for the system 100 to try may be to see if the values should be in range 01, 02, 03, . . . , 12.

As another different example, which is indicative of learning, it may be that the hypothesis of a field the system 100 understands to be a month field is not correct at all, and when the system 100 attempts different permutations of numeric constraints, none of the numeric constraints are satisfied. At that time, the system 100 may recognize that the original hypothesis is completely wrong, and the system 100 may provide information to the knowledge engine 153 indicating the incorrect hypothesis for future use. Next, the system 100 may try textual month representations (e.g. Jan or January, Feb or February, etc.). If this also fails again, the system 100 may recognize that the hypothesis is completely wrong, and may provide an indication of this to the knowledge engine 153 for future use. In certain embodiments, if the system 100 is unable to satisfy the constraint for this field, the system 100 may check for other knowledge sources, other hypothesis to test, other models to use, other applications under evaluation 230, other systems, or the system 100 may need to generate an issue or conflict to a human user so that the human user can advise regarding the proper behavior. If the system 100 needs to wait on a conflict to be resolved externally, the system 100 may continue on with discovery, constraint identification, and hypothesis testing of other portions of the application under evaluation 230, which are not affected by the conflict.

The systems and methods disclosed herein may include still further functionality and features. In certain embodiments, when parsing text from various sources, the text may be extracted from labels, widgets, web pages and window titles, help text, help videos, and/or any other accessible artifacts associated with the application under evaluation 230. In still other embodiments, the system 100 may perform lookups of terms that may be in other systems, such as, but not limited to, previously released applications under evaluation 230, accessible systems that are not under test by the system 100, online and/or internet sources, such as Wikipedia™, online journals, online domain knowledge, and other sources, such as, but not limited to, release notes, requirements, user stories, software and/or hardware manuals, API documents, etc. Notably, the systems and methods may be implemented in the environment as shown in FIG. 2 and in U.S. patent application Ser. No. 15,905,362, filed on Feb. 26, 2018. For example, the functionality provided by the system 100 and/or the method 600 may be implemented as part of either or both of the static model discovery module 200 and/or the dynamic model discovery module 206. In certain embodiments, the system 100 and/or method 600 may include receiving text or other content from internal data sources 201, external data sources 202, and/or the application under evaluation 230. In further embodiments, the system 100 and/or method 600 may include receiving text or other content from any of the agglomerated models 208. The text or other content may be standalone in a document, contained within a table, contained within a picture (which may need optical character recognition (OCR) to read), contained within a subset of a larger document, and/or any other such configuration. In certain embodiments, the system 100 and method 600 may include updating, constructing, modifying, and/or storing constraints in any of the agglomerated models 208 with results and/or information accomplished by the system 100 and/or method 600, such as, but not limited to, the CM model 216, the LM model 215, the FSM model 209, ER-DB model 211, and/or any other model. In certain embodiments, the agglomerated models 208 may include portions of the knowledge sources (e.g. contained in knowledge engine 153 and/or elsewhere).

In certain embodiments, an analysis engine 239 and/or composer 221 may take one model of the agglomerated models 208, such as FSM model 209 or ER-DB 211, which contains one or more constraints, and may construct hypothesis test cases (e.g. which may be scripts composed of computer code 244). In certain embodiments, the system 100 may operate in one or more analysis engines 239 or 220 executers/evaluators. Then, the hypothesized test cases may execute (such as by utilizing validator 222), and produce test results 246, test data 247, or a combination thereof. Based on the test results 246 and test data 247, report generator 238 may generate hypothesis test case result reports 242. Further, learning engine 226 may adjust confidences of hypothesized tests and results based on the results 246. Learning engine 226 may also store confidences and other items learned into a knowledge source, such as any of the agglomerated models 208. Such knowledge may be used to improve discovery of future constraints, alter or improve test hypothesis execution, or better understand any of agglomerated models 208, which may then be used to ultimately better understand the application under evaluation 230 and/or or internal and/or external data sources 201, 202. In still further embodiments, the learning engine 226 may utilize the results of the system 100 and/or method 600 alone or in combination with the agglomerated models 208 to determine patterns, histories, probabilities, confidences, and other information associated with constraints, fields, orders of operations, and/or transitions within an application under evaluation 230. In certain embodiments, the learning engine 226 may be configured to provide guidance regarding which constraints are most suitable for a particular application under evaluation 230, agglomerated model 208, and/or other component provided in FIGS. 1 and 2.

The systems and methods disclosed herein may include further functionality and features. For example, the operative functions of the system 100 and method 600 may be configured to execute on a special-purpose processor specifically configured to carry out the operations provided by the system 100 and method 600. Notably, the operative features and functionality provided by the system 100 and method 600 may increase the efficiency of computing devices that are being utilized to facilitate the functionality provided by the system 100 and method 600. For example, the system 100 and method 600 can optimize the performance of future actions through machine learning, such that a reduced amount of computer operations need to be performed by the devices in the system 100 using the processors and memories of the system 100 than in systems that are not capable of machine learning as described in this disclosure. In such a context, less processing power may need to be utilized because the processors and memories do not need to perform actions, operations, and analyses that have already been conducted by the system 100. In certain embodiments, the system 100 may learn that certain state(s) associated with and/or from discovery and/or testing may be faster on certain processing hardware. For example, for a state with complex mathematical operations and/or graphics, the system 100 may perform better when there is a floating point processor or a graphics processing unit. As another example, when compared to traditional part of speech solutions, the discovery of field, navigation, and/or order of operation constraints reduces computing costs, as measured by central processing unit (CPU) cycles, memory usage, and network bandwidth. In certain embodiments, the system 100 accomplishes such reductions in computing costs by learning over time which constraints should be utilized with which fields, order of operations, and/or transitions for applications being evaluated by the system 100, refining the constraints as new information is received by the system 100, learning which hypotheses and/or tests are more efficient and/or superior to other hypotheses and/or tests, learning which sources of knowledge and information produce higher confidence level constraints and/or constraints relevant to an application under evaluation 230, any other learning, or any combination thereof. As a result, the functionality provided by the system 100 and method 600 may provide substantial savings in the usage of computer resources by utilizing the software and functionality provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, system 100 may operate continuously to reduce the possibility of defects, conflicts, and/or errors from being introduced into the system 100 and/or the application under evaluation 230. In certain embodiments, the system 100 and methods may also provide effective computing resource management by utilizing the features and functions described in the present disclosure. For example, in certain embodiments, the system 100 may specify a quantity of computer processor resources (e.g. processor clock cycles, processor speed, processor cache, etc.) that may be dedicated to parsing text extracted from outputs of the application under evaluation 230; parsing text extracted from hierarchical and/or graphical models of applications (e.g. application under evaluation 230); parsing text extracted from internal and/or external sources 201, 202; correlating the parsed text and/or sources of the text with one or more fields, an order of operations, and/or transition of an application under evaluation 230; generating constraints; determining if the constraint can be combined or merged with another constraint; conducting hypothesis testing using the constraints; determining if a constraint is valid; generating feedback based on test results from the hypothesis testing; updating confidence levels for hypotheses, tests, sources of information, and/or constraints; and performing any other operations conducted by the system 100, or any combination thereof. As another example, the system 100 may indicate a quantity of processor cycles of a processor that may be utilized to obtain data, process obtained data, and/or specify a selected amount of processing power that may be dedicated to evaluating the application under evaluation 230 or conducting the static and dynamic model discovery.

In certain embodiments, any device or program in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and method 600 at time periods when usage of processing resources and/or memory resources in the system 100 is at a selected and/or threshold value. In certain embodiments, the threshold may be a price of using a resource (e.g. CPU, RAM, network resources, virtual machine resources, etc.), such as in a cloud environment. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100. For example, a signal may be transmitted to the memory devices indicating which portions of the memories should be dedicated to generating constraints, conducting hypothesis testing, analyzing test results of the hypothesis testing, determining source concepts from parsed text, analyzing graphical and/or hierarchical models of various applications (e.g. application under evaluation 230), utilizing natural language processing techniques to parse and extract meaning from text, generating hypotheses, generating tests for hypotheses and/or constraints, processing feedback generated based on the tests results, providing updates for the agglomerated models 208, any other information stored by the system 100, or a combination thereof. Notably, the signals transmitted to the processors and memories may be utilized to optimize the usage of computing resources while executing the operations conducted by the system 100. As a result, such features provide substantial operational efficiencies and improvements over existing technologies.

Figure 7:
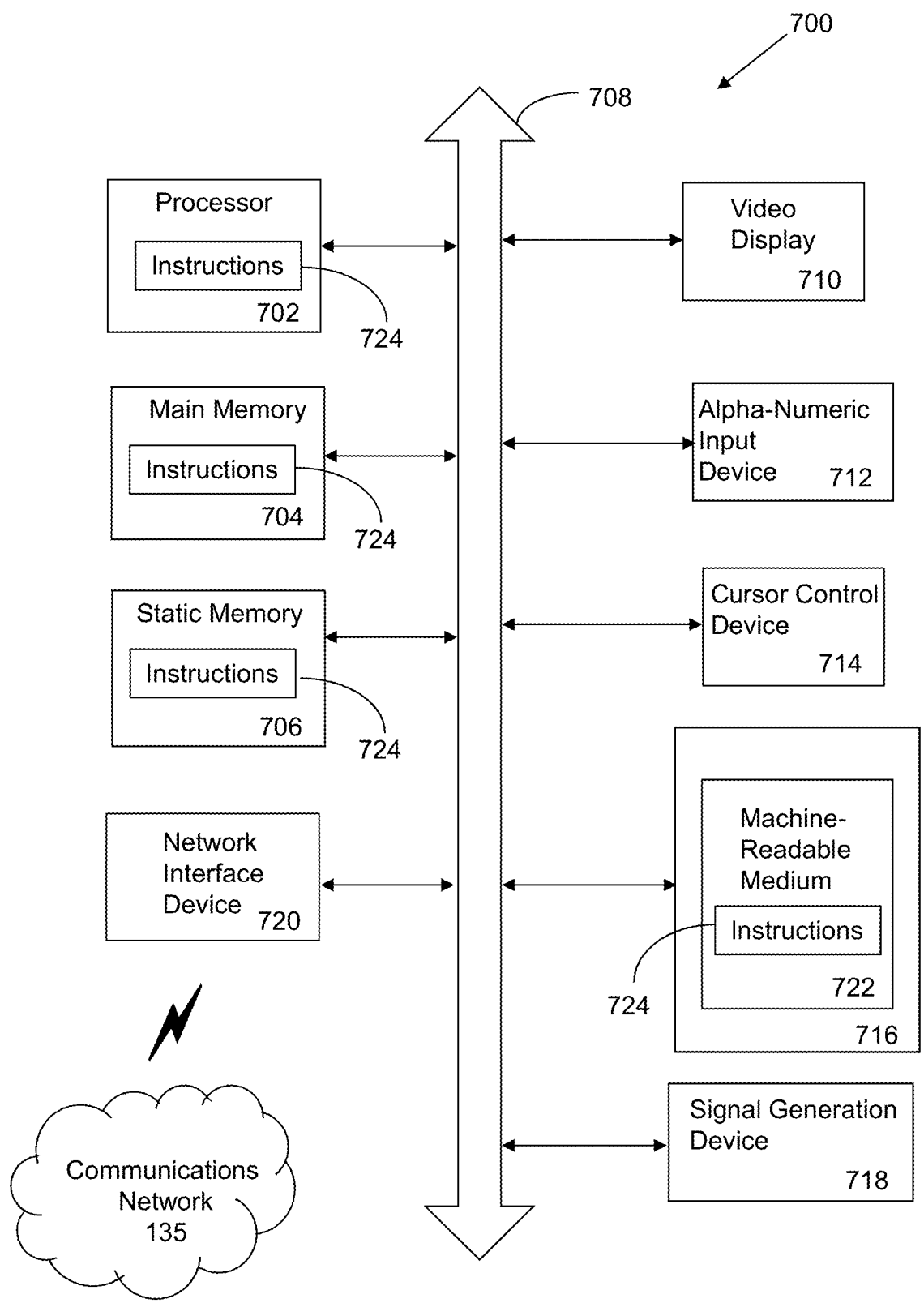
FIG. 7 is a schematic diagram of a machine in the form of a computer system within which a set of instructions, when executed, may cause the machine to perform any one or more of the methodologies or operations of the systems and methods for providing autonomous discovery of field or navigation constraints.

Referring now also to FIG. 7, at least a portion of the methodologies and techniques described with respect to the exemplary embodiments of the system 100 can incorporate a machine, such as, but not limited to, computer system 700, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the natural language processing engine 143, the part of speech tagger 144, the server 150, the knowledge engine 153, the hypothesis test 154, the constraint solver 156, the database 155, the server 160, or any combination thereof. The machine may assist with operations performed by the static model discovery module 200, the model change management module 204, the dynamic module discovery module 206, the controller 224, the learning engine 226, evaluators 220, the application under evaluation 230, the data transformers 232, any other component in the system, any programs in the system, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710, which may be, but is not limited to, a liquid crystal display (LCD), a flat panel, a solid state display, or a cathode ray tube (CRT). The computer system 700 may include an input device 712, such as, but not limited to, a keyboard, a cursor control device 714, such as, but not limited to, a mouse, a disk drive unit 716, a signal generation device 718, such as, but not limited to, a speaker or remote control, and a network interface device 720.

The disk drive unit 716 may include a machine-readable medium 722 on which is stored one or more sets of instructions 724, such as, but not limited to, software embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 722 containing instructions 724 so that a device connected to the communications network 135, another network, or a combination thereof, can send or receive voice, video or data, and communicate over the communications network 135, another network, or a combination thereof, using the instructions. The instructions 724 may further be transmitted or received over the communications network 135, another network, or a combination thereof, via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system comprising:
a memory that stores instructions; and
a processor that executes the instructions to perform operations, the operations comprising:
receiving an input comprising information associated with an application under evaluation by the system;
determining, based on analyzing the input via a first natural language processing technique, a constraint for the application under evaluation, wherein the constraint is for a field of the application under evaluation, an order of operations of the application under evaluation, a transition of the application under evaluation, or a combination thereof;
generating, based on the constraint, based on the input, or based on a combination thereof, a hypothesis associated with the constraint and a test for testing, based on the hypothesis, the constraint;
testing, by utilizing the test on the application under evaluation and based on the hypothesis, the constraint;
generating feedback associated with a result of the testing of the constraint based on the hypothesis, wherein the feedback includes confidence level information corresponding to the constraint and a first knowledge source associated with the input; and
adjusting, based on the feedback, the constraint, input information related to the constraint, or a combination thereof, wherein the constraint is adjusted based on a second knowledge source and a second natural language processing technique that are selected based on the feedback indicating that a confidence level for the second knowledge source is higher than the confidence level information corresponding to the first knowledge source and that a confidence level for the second natural language processing technique is higher than confidence level information corresponding to the first natural language processing technique.

2. The system of claim 1, wherein the information in the input comprises a model, realized or unrealized, of at least a portion of the application under evaluation by the system, an existing constraint, or a combination thereof.

3. The system of claim 1, wherein the determining of the constraint further comprises modifying an existing constraint.

4. The system of claim 1, wherein the operations further comprise adjusting a confidence level of the hypothesis associated with the constraint, a different hypothesis generated based on the hypothesis, another hypothesis associated with a different constraint, adjusting a confidence level of the constraint, an existing confidence level of the constraint, a confidence level of a different constraint generated based on the hypothesis, or a combination thereof.

5. The system of claim 1, wherein the input further comprises information obtained from documents internal to the system, documents external to the system, other sources, or a combination thereof, and wherein the operations further comprise determining the constraint based on the input comprising the information obtained from the documents internal to the system, the documents external to the system, the other sources, or the combination thereof.

6. The system of claim 1, wherein the operations further determining the constraint based on at least one source concept extracted from text from the input.

7. The system of claim 1, wherein the determining of the constraint comprises determining a possible type of value of the field of the application under evaluation, a range of values for the field of the application under evaluation, a precision for a value for the field of the application under evaluation, an indication of a sequence operations of the application under evaluation, an identification of at least one task to be completed to facilitate the transition of the application under evaluation, a characteristic of the field, whether the field is required or optional, or a combination thereof.

8. The system of claim 1, wherein the operations further comprise generating a set of solutions for the constraint, a set of solutions for a negation of the constraint, or a combination thereof.

9. The system of claim 1, wherein the operations further comprise determining if an alert, an error, or a combination thereof, has been generated based on the testing.

10. The system of claim 9, wherein the operations further comprise utilizing a natural language processing technique to parse text extracted from the alert, the error, or a combination thereof, and wherein the operations further comprise determining a new constraint for the application under evaluation based on a source concept determined from the parsed text extracted from the alert, the error, or a combination thereof.

11. The system of claim 1, wherein the operations further comprise determining, after testing the constraint based on the hypothesis and based on the result of the testing, if the constraint should be combined with another constraint to form a merged or combined constraint.

12. The system of claim 11, wherein the operations further comprise forming the merged or combined constraint by combining the constraint with the another constraint if the testing indicates a relationship between the constraint and the another constraint, a first dependence of the constraint on the another constraint, a second dependence of the another constraint on the constraint, or a combination thereof.

13. The system of claim 1, wherein the operations further comprise removing a constraint based on the result of the testing.

14. The system of claim 1, wherein the operations further comprise adjusting a confidence.

15. The system of claim 1, wherein the operations further comprise detecting defects, conflicts, or a combination thereof, in the constraint, the hypothesis, or a combination thereof, based on the testing.

16. The system of claim 1, wherein the operations further comprise validating the constraint using the application under evaluation.

17. The system of claim 1, wherein the operations further comprise generating another hypothesis based on the hypothesis if the result of the testing indicates that the hypothesis is incorrect, inaccurate, incomplete, or a combination thereof.

18. The system of claim 1, wherein the operations further comprise training or improving a model, a parameter, a weight, a dictionary, a threshold, a confidence, or a filter associated with generating a future hypothesis or constraint, wherein the training or improving is based on the feedback, the result, an internal document, an external document, the application under evaluation, a constraint similar to the constraint, a constraint related to the constraint, a merged constraint, a combined constraint, a generalized constraint, another constraint, another hypothesis similar to the hypothesis, another hypothesis related to the hypothesis, another hypothesis, a concept, a confirmation or rejection of the constraint, any other source, or combination thereof.

19. A method comprising:
analyzing text extracted from an input comprising information associated with an application under evaluation by a system, wherein the analyzing is performed by utilizing a first natural language processing technique;
determining, based on the analyzing, a constraint for the application under evaluation, wherein the constraint is for a field of the application under evaluation, an order of operations of the application under evaluation, a transition of the application under evaluation, or a combination thereof;
generating, based on the constraint and by utilizing instructions from a memory that are executed by a processor, a hypothesis associated with the constraint;
testing, by utilizing a test on the application under evaluation and based on the hypothesis, the constraint;
generating feedback associated with a result of the testing of the constraint based on the hypothesis, wherein the feedback includes confidence level information corresponding to the constraint and a first knowledge source associated with the input; and
adjusting, based on the feedback, the constraint, input information related to the constraint, or a combination thereof, wherein the constraint is adjusted based on a second knowledge source and a second natural language processing technique that are selected based on the feedback indicating that a confidence level for the second knowledge source is higher than the confidence level information corresponding to the first knowledge source and that a confidence level for the second natural language processing technique is higher than confidence level information corresponding to the first natural language processing technique.

20. The method of claim 19, wherein the input further comprises a model of at least a portion of the application under evaluation, and further comprising extracting text from the model.

21. The method of claim 19, wherein the determining of the constraint further comprises determining the constraint based on conducting static model discovery, dynamic model discovery, or a combination thereof.

22. The method of claim 19, further comprising updating an agglomerated model to include the constraint.

23. The method of claim 19, further comprising testing a different hypothesis generated based on the hypothesis on the application under evaluation, and further comprising generating additional feedback associated with a result of the testing of the different hypothesis.

24. The method of claim 19, further comprising continuously generating hypotheses for additional constraints as the additional constraints are determined, further comprising testing the hypotheses for the additional constraints on the application under evaluation, and further comprising generating additional feedback based on results obtained from the testing of the hypotheses for the additional constraints.

25. The method of claim 19, further comprising adjusting, based on additional feedback, future hypotheses generated by the system, future constraints determined by the system, confidence levels for the future hypotheses, or a combination thereof.

26. A non-transitory computer-readable device comprising instructions, which when loaded and executed by a processor, cause the processor to perform operations comprising:
analyzing text extracted from an input, wherein the analyzing is performed by utilizing a first natural language processing technique;
determining, based on the analyzing and based on a first knowledge source associated with the input, a constraint for an application under evaluation by a system, wherein the constraint is for a field of the application under evaluation, an order of operations of the application under evaluation, a transition of the application under evaluation, or a combination thereof;
generating, based on the constraint, a hypothesis associated with the constraint;
testing, by utilizing a test on the application under evaluation, the hypothesis associated with the constraint;
determining if the constraint is combinable with a different constraint based on a result of the testing of the hypothesis associated with the constraint, based on a confidence level of a first hypothesis, based on a confidence level of a second hypothesis associated with the different constraint, or a combination thereof;
combining the constraint with the different constraint to form a merged constraint if the constraint is determined to be combinable with the different constraint; and
adjusting the merged constraint based on a second knowledge source and a second natural language processing technique that are selected based on feedback indicating that a confidence level for the second knowledge source is higher than confidence level information corresponding to the first knowledge source and that a confidence level for the second natural language processing technique is higher than confidence level information corresponding to the first natural language processing technique.

27. The non-transitory computer-readable device of claim 26, wherein the operations further comprise training or improving a model, a parameter, a weight, a dictionary, a threshold, a confidence, or a filter associated with generating a future hypothesis or constraint, wherein the training or improving is based on feedback associated with the result, test results, an internal document, an external document, the application under evaluation, a similar constraint, a related constraint, another merged constraint, a combined constraint, a generalized constraint, another constraint, a similar hypothesis, a related hypothesis, another hypothesis, a concept, a confirmation or rejection of the constraint, any other source, or combination thereof.

\* \* \* \* \*